US011159048B2

(12) United States Patent
Sato et al.

(10) Patent No.: US 11,159,048 B2
(45) Date of Patent: Oct. 26, 2021

(54) WIRELESS POWER TRANSMISSION SYSTEM, POWER TRANSMITTING DEVICE, AND POWER RECEIVING DEVICE WITH CIRCUIT TO APPLY A TRIGGER SIGNAL

(71) Applicant: Panasonic Intellectual Property Management Co., Ltd., Osaka (JP)

(72) Inventors: Kazunori Sato, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/770,698

(22) PCT Filed: Dec. 11, 2018

(86) PCT No.: PCT/JP2018/045496
§ 371 (c)(1),
(2) Date: Jun. 8, 2020

(87) PCT Pub. No.: WO2019/117140
PCT Pub. Date: Jun. 20, 2019

(65) Prior Publication Data
US 2021/0167631 A1 Jun. 3, 2021

(30) Foreign Application Priority Data
Dec. 11, 2017 (JP) .............................. JP2017-236912

(51) Int. Cl.
*H02J 50/05* (2016.01)
*H02J 50/12* (2016.01)
(Continued)

(52) U.S. Cl.
CPC ............ *H02J 50/05* (2016.02); *B60L 53/122* (2019.02); *B60L 53/20* (2019.02); *H02J 7/02* (2013.01);
(Continued)

(58) Field of Classification Search
CPC .................................. H02J 50/00; H04B 5/00
(Continued)

(56) References Cited

U.S. PATENT DOCUMENTS 9,741,487 B2 * 8/2017 Waffenschmidt ....... H02J 50/10
2008/0200119 A1 8/2008 Onishi
(Continued)

FOREIGN PATENT DOCUMENTS

JP 2008-206231 A 9/2008
JP 2009-011129 A 1/2009
(Continued)

OTHER PUBLICATIONS

International Search Report for corresponding Application No. PCT/JP2018/045496, dated Mar. 5, 2019.

*Primary Examiner* — Adi Amrany
(74) *Attorney, Agent, or Firm* — Renner, Otto, Boisselle & Sklar, LLP

(57) ABSTRACT

A wireless power transmission system includes a power transmitting device and a power receiving device. The power transmitting device includes: a first inverter circuit to output charging power to be directed to power transmission; a power transmitting antenna; and a first control circuit to control the first inverter circuit. The power receiving device includes: a power receiving antenna; and a trigger application circuit to apply, to detecting power to be supplied to the power receiving antenna, a trigger signal for informing of the power transmitting device of the presence of the power receiving device. Upon detecting the trigger signal, the first control circuit causes the first inverter circuit to begin outputting the charging power.

18 Claims, 22 Drawing Sheets

(51) Int. Cl.
*B60L 53/20* (2019.01)
*B60L 53/122* (2019.01)
*H02J 7/02* (2016.01)
*H02J 50/80* (2016.01)
*G05D 1/00* (2006.01)

(52) U.S. Cl.
CPC ............ *H02J 50/12* (2016.02); *G05D 1/0088* (2013.01); *H02J 50/80* (2016.02)

(58) Field of Classification Search
USPC .......................................................... 307/104
See application file for complete search history.

(56) References Cited

U.S. PATENT DOCUMENTS

| | | | |
|---|---|---|---|
| 2009/0001932 A1 | 1/2009 | Kamijo | |
| 2009/0284220 A1* | 11/2009 | Toncich | H01Q 1/2225 320/108 |
| 2014/0183973 A1* | 7/2014 | Sempel | H02J 5/005 307/109 |
| 2014/0191568 A1* | 7/2014 | Partovi | H02J 50/12 307/9.1 |
| 2014/0253052 A1 | 9/2014 | Goma | |
| 2015/0155918 A1* | 6/2015 | Van Wageningen | H02J 50/12 307/104 |
| 2015/0229135 A1 | 8/2015 | Porat | |
| 2016/0056664 A1* | 2/2016 | Partovi | B60L 53/122 307/104 |
| 2016/0087448 A1 | 3/2016 | Takahashi | |
| 2016/0156229 A1 | 6/2016 | Sakata | |
| 2017/0061142 A1* | 3/2017 | Niessen | G06F 1/26 |
| 2017/0093222 A1* | 3/2017 | Joye | H04B 5/0087 |
| 2018/0083349 A1* | 3/2018 | Sieber | B60L 53/39 |

FOREIGN PATENT DOCUMENTS

| | | |
|---|---|---|
| JP | 2014-212660 A | 11/2014 |
| JP | 2016-197992 A | 11/2016 |
| WO | 2013/077086 A1 | 5/2013 |
| WO | 2014/174790 A1 | 10/2014 |

* cited by examiner

WIRELESS POWER TRANSMISSION SYSTEM, POWER TRANSMITTING DEVICE, AND POWER RECEIVING DEVICE WITH CIRCUIT TO APPLY A TRIGGER SIGNAL

TECHNICAL FIELD

The present disclosure relates to a wireless power transmission system, a power transmitting device, and a power receiving device.

BACKGROUND ART

In recent years, development efforts have been directed to wireless power transmission techniques for wirelessly (i.e., in a non-contacting manner) transmitting power to mobile phones and devices involving mobility, e.g., electric vehicles. Wireless power transmission techniques include the magnetic-field coupling method, the electric-field coupling method, and other methods. In the magnetic-field coupling method, power is wirelessly transmitted via magnetic-field coupling between a power transmitting coil and a power receiving coil. In the electric-field coupling method, power is wirelessly transmitted via electric-field coupling between a pair of power transmitting electrodes and a pair of power receiving electrodes. Wireless power transmission systems based on the electric-field coupling method are disclosed in Patent Document 1, for example.

CITATION LIST

Patent Literature

[Patent Document 1] International Publication No. 2013/077086

SUMMARY OF INVENTION

Technical Problem

The present disclosure provides a wireless power transmission system which is suitable for feeding power to a movable unit such as an automated guided vehicle (AGV).

Solution to Problem

A wireless power transmission system according to an implementation of the present disclosure includes a power transmitting device and a power receiving device. The power transmitting device includes: a first conversion circuit to convert power supplied from a first power source into charging power to be directed to charging in the power receiving device; a power transmitting antenna to send out the charging power which is output from the first conversion circuit; a first control circuit to control the first conversion circuit; and a first detection circuit to detect a fluctuation in current and/or voltage at a point on a transmission line from the first power source to the power transmitting antenna. The power receiving device includes: a power receiving antenna to receive the charging power which is sent out from the power transmitting antenna; a power receiving circuit to convert the charging power received by the power receiving antenna into an AC power of a frequency different from that of the charging power or DC power, and to supply the AC power or the DC power to a load; and a trigger application circuit to apply a trigger signal for informing the power transmitting device of presence of the power receiving device onto detecting power which is supplied from the power transmitting antenna side or the power receiving circuit side to the power receiving antenna. While the detecting power having the trigger signal applied thereto is supplied to the power receiving antenna, upon detecting the trigger signal based on a result of detection by the first detection circuit, the first control circuit causes the first conversion circuit to begin outputting the charging power.

General or specific implementations of the present disclosure may be implemented as an apparatus, a system, a method, an integrated circuit, a computer program, or a storage medium. Alternatively, it may be implemented by a combination of an apparatus, a system, a method, an integrated circuit, a computer program, and a storage medium.

Advantageous Effects of Invention

With the technique according to the present disclosure, a wireless power transmission system which is more suitable for feeding power to a movable unit can be realized.

DESCRIPTION OF EMBODIMENTS (Findings Providing the Basis of the Present Disclosure)

Prior to describing embodiments of the present disclosure, findings providing the basis of the present disclosure will be described. Herein, a wireless power transmission system based on the electric-field coupling method will be illustrated for example. Without being limited to the electric-field coupling method, the technique of the present disclosure is also applicable to a wireless power transmission system based on the magnetic-field coupling method (e.g., an electromagnetic induction approach).

Figure 1:
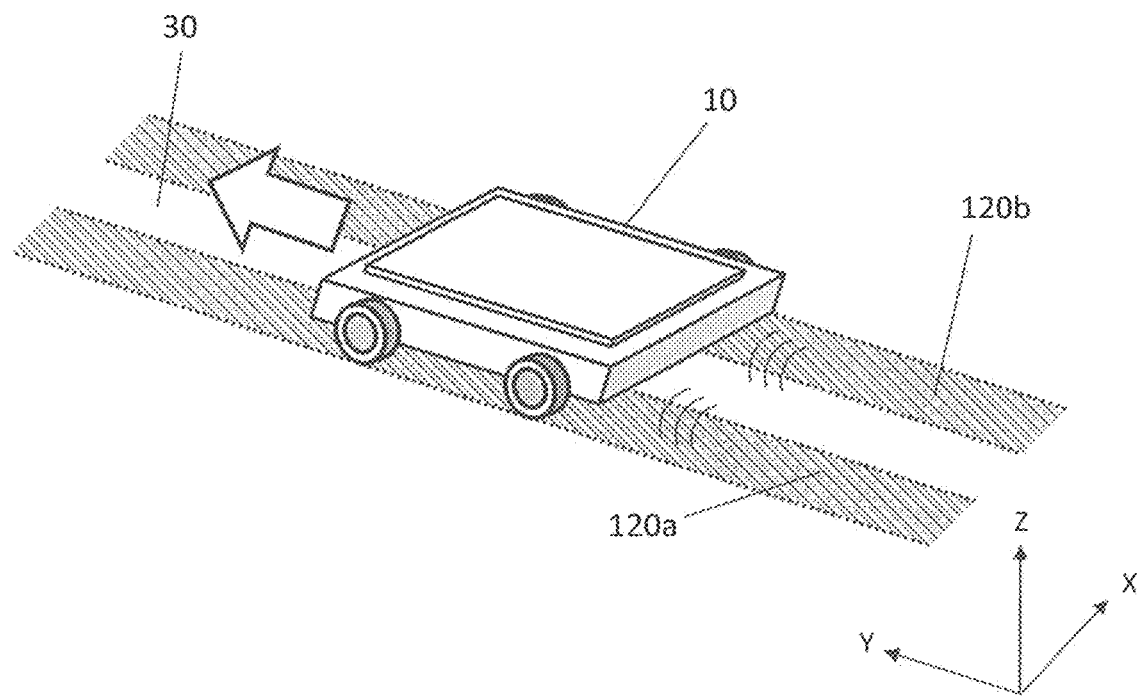
FIG. 1 is a diagram schematically showing an example of a wireless power transmission system based on the electric-field coupling method.

FIG. 1 is a diagram schematically showing an example of a wireless power transmission system based on the electric-field coupling method. The "electric-field coupling method" refers to a method of transmission where, through capacitive coupling (i.e., electric-field coupling) between a power transmitting electrode group which includes a plurality of power transmitting electrodes and a power receiving electrode group which includes a plurality of power receiving electrodes, power is wirelessly transmitted from the power transmitting electrode group to the power receiving electrode group. For simplicity, an example where each of the power transmitting electrode group and the power receiving electrode group is composed of a pair of two electrodes will be described. Each of the power transmitting electrode group and the power receiving electrode group may include three or more electrodes.

The wireless power transmission system shown in FIG. 1 is a system which wirelessly transmits power to a movable unit 10, which is an automated guided vehicle (AGV) used for transferring articles within a factory, for example. In this system, a pair of plate-like power transmitting electrodes 120a and 120b are placed on a floor surface 30. The movable unit 10 includes a pair of power receiving electrodes which, during power transmission, are opposed to the pair of power transmitting electrodes 120a, 120b. With the pair of power receiving electrodes, the movable unit 10 receives AC power which is transmitted from the pair of power transmitting electrodes 120a, 120b. The received power is supplied to the motors, secondary batteries, capacitor for charge-storing purposes, or other loads included in the movable unit 10. As a result of this, the movable unit 10 is driven or charged.

FIG. 1 shows XYZ coordinates representing X, Y, and Z directions which are orthogonal to one another. The following description will rely on XYZ coordinates as shown in the drawings. The direction that the power transmitting electrodes 120a and 120b extend will be denoted as the Y direction, a direction which is perpendicular to the surface of the power transmitting electrodes 120a and 120b as the Z direction, and a direction which is perpendicular to the Y direction and the Z direction (i.e., a direction along which the power transmitting electrodes 120a and 120b flank each other) as the X direction. Note that the orientation of any given structure shown in the drawings of the present application is chosen for ease of understanding of the description, rather than limiting in any way its orientation when an embodiment of the present disclosure is actually practiced. Moreover, the shape and size of a whole or a part of any structure shown in the drawings do not limit its actual shape and size, either.

Figure 2:
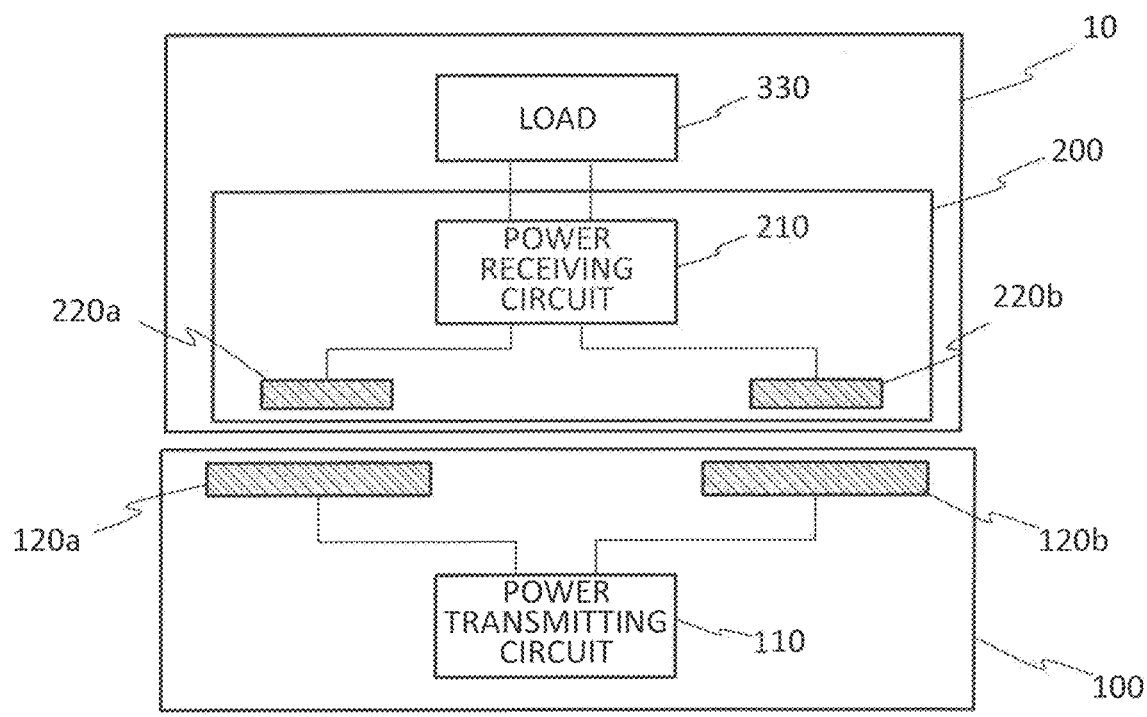
FIG. 2 is a diagram showing a schematic configuration of the wireless power transmission system shown in FIG. 1.

FIG. 2 is a diagram showing a schematic configuration of the wireless power transmission system shown in FIG. 1. This wireless power transmission system includes a power transmitting device 100 and the movable unit 10. The power transmitting device 100 at least includes the pair of power transmitting electrodes 120a and 120b and a power transmitting circuit 110 which supplies AC power to the power transmitting electrodes 120a and 120b. The power transmitting circuit 110 may be an AC output circuit which includes a conversion circuit such as an inverter circuit, for example. The power transmitting circuit 110 converts DC power which is supplied from a DC power source not shown into AC power, and outputs it to the pair of power transmitting electrodes 120a and 120b. Alternatively, it may convert AC power which is supplied from an AC power source (not shown) into an AC power of a different frequency or voltage, and output it to the pair of power transmitting electrodes 120*a* and 120*b*. Between the power transmitting electrodes 120*a* and 120*b* and the power transmitting circuit 110, a matching circuit may be inserted for alleviating impedance mismatch.

The movable unit 10 includes a power receiving device 200 and a load 330. The power receiving device 200 at least includes: a pair of power receiving electrodes 220*a* and 220*b*; and a power receiving circuit 210 that converts AC power which is received by the power receiving electrodes 220*a* and 220*b* into an power which is required by the load 330 and supplies it to the load 330. The power receiving circuit 210 may include various circuits, such as a rectifier circuit or a frequency conversion circuit, for example. Between the power receiving electrodes 220*a* and 220*b* and the power receiving circuit 210, a matching circuit for alleviating impedance mismatch may be inserted.

The load 330 is a device which consumes or stores power, e.g., a motor, a capacitor for charge-storing purposes, or a secondary battery, etc. Through electric-field coupling between the pair of power transmitting electrodes 120*a* and 120*b* and the power receiving electrodes 220*a* and 220*b*, while they are opposed to each other, power is wirelessly transmitted.

In the following description, the power transmitting electrodes 120*a* and 120*b* may be denoted as the "power transmitting electrodes 120" without distinction. Similarly, the power receiving electrodes 220*a* and 220*b* may be denoted as the "power receiving electrodes 220" without distinction.

In this example, the power transmitting circuit 110 has the function of detecting an approaching movable unit 10. Upon detecting the approaching of the movable unit 10, the power transmitting circuit 110 begins power transmission. This function will be described with reference to FIG. 3A through FIG. 3C.

Figure 3A:
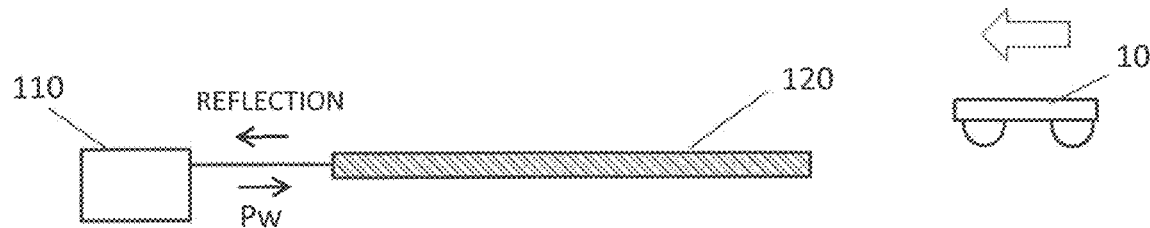
FIG. 3A schematically shows a state where a movable unit 10 is coming near power transmitting electrodes 120.

FIG. 3A schematically shows a state where the movable unit 10 is coming near the power transmitting electrodes 120. The movable unit 10 may approach the power transmitting electrodes 120 relatively rapidly (e.g., at a velocity of about several ten meters per minute to about one thousand meters per minute). In this state, the power transmitting circuit 110 is intermittently outputting an energy (i.e., power) Pw which is so weak as not to affect the surrounding environment. Then, the power transmitting circuit 110 monitors the reflected energy from the power transmitting electrodes 120 in order to detect the approaching of the movable unit 10 to above the power transmitting electrodes 120.

Figure 3B:
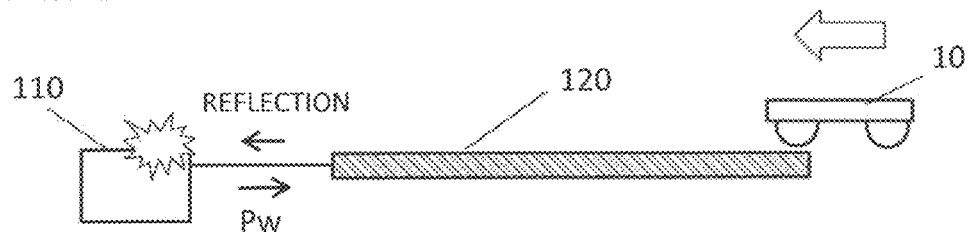
FIG. 3B schematically shows a state where power receiving electrodes 220 in the movable unit 10 have come above the power transmitting electrodes 120.

FIG. 3B schematically shows a state where the power receiving electrodes 220 in the movable unit 10 have come above the power transmitting electrodes 120. At this point, a portion of the detection energy begins to be transmitted from the power transmitting electrodes 120 to the power receiving electrodes 220. Then, the energy that is reflected toward the power transmitting circuit 110 changes, whereby the waveform of current, voltage, etc., in the power transmitting circuit 110 changes. By detecting this change, the power transmitting circuit 110 detects that the power receiving electrodes 220 have begun to be opposed to the power transmitting electrodes 120. Upon detecting that the power receiving electrodes 220 have begun to be opposed to the power transmitting electrodes 120, the power transmitting circuit 110 increases the output power to a relatively large power to be directed to power transmission.

Figure 3C:
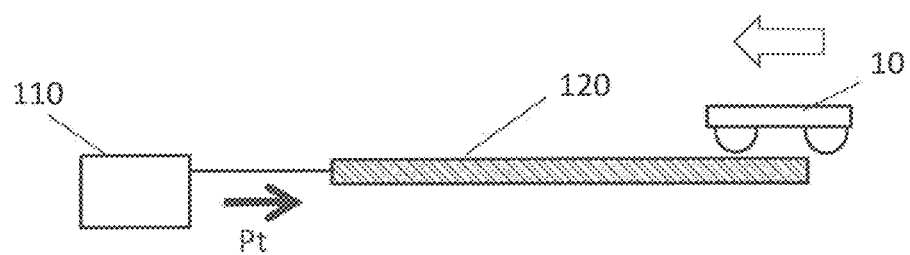
FIG. 3C schematically shows a state where a power transmitting circuit 110 is outputting a relatively large power Pt to be directed to power transmission.

FIG. 3C schematically shows a state where the power transmitting circuit 110 is outputting a relatively large power Pt to be directed to power transmission. Power transmission from the power transmitting electrodes 120 to the power receiving electrodes 220 is conducted in this state. Power transmission is begun while the movable unit 10 is moving along the power transmitting electrodes 120, and may be continued during the move.

The inventors have found that, in a wireless power transmission system which undergoes such operation, a misdetection may occur when an object that is different from the movable unit 10 (which hereinafter may also be referred to as a "foreign object") approaches the power transmitting electrodes 120. This problem will be described below.

Figure 4A:
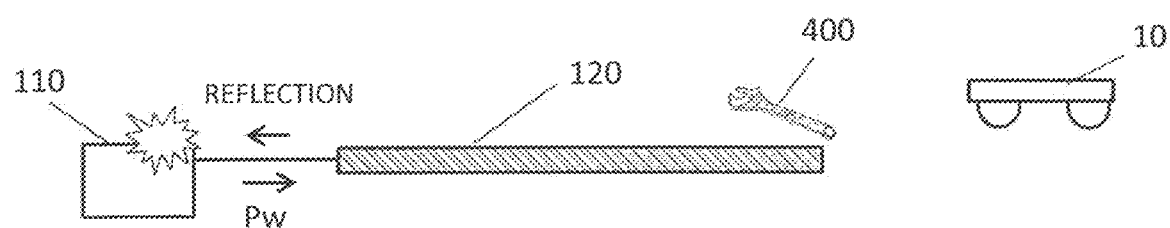
FIG. 4A is a diagram schematically showing a state where, a foreign metal object 400, rather than the movable unit 10, is placed near the power transmitting electrodes 120.

FIG. 4A schematically shows a state where an object 400, rather than the movable unit 10, is placed near the power transmitting electrodes 120. In this state, too, there is an undeniable possibility that an impedance change for the power transmitting electrodes 120 may exhibit characteristics resembling those associated with an approaching movable unit 10. In other words, similarly to the state shown in FIG. 3B, a change may occur in the reflected energy that is detected by the power transmitting circuit 110. In particular, when the object 400 is composed of a metal, or when the object 400 is placed astride the pair of power transmitting electrodes 120, its influence may be large. In this case, the power transmitting circuit 110 may wrongly recognize that the movable unit 10 has approached. For the intended purpose of the present application, arrival of a movable unit is to be determined in a short period of time. In that case, depending on the motion of object 400, (e.g., a velocity of its fall onto the power transmitting electrodes 120), the reflected energy may have a transient increase before or after the motion, thus resulting in an increased likelihood of misdetection.

Figure 4B:
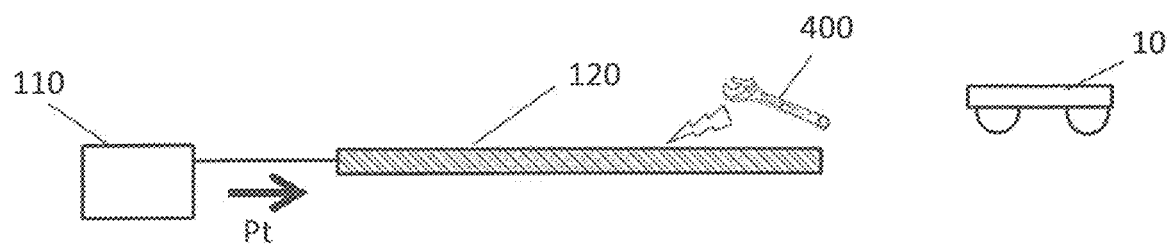
FIG. 4B schematically shows a state where, due to a misrecognition, the power transmitting circuit 110 is outputting power Pt to be directed to power transmission.

FIG. 4B schematically shows a state where, due to a misrecognition, the power transmitting circuit 110 is outputting power Pt to be directed to power transmission. In this state, although the movable unit 10 is not located above the power transmitting electrodes 120, power Pt is being output. In such a state, problems such as destruction of the circuit in the power transmitting circuit 110 may occur.

One measure for avoiding the above problem may be to establish communications between the movable unit 10 and the power transmitting device, and begin power transmission only when the power transmitting circuit 110 is requested by the movable unit 10 to do so. This solution will be described with reference to FIG. 5A through FIG. 5D.

In the examples illustrated in FIG. 5A through FIG. 5D, the power transmitting device includes a first communication device 190. The first communication device 190 performs communications with the movable unit 10. Based on a signal which the first communication device 190 receives from the movable unit 10, the power transmitting circuit 110 may adjust the AC power to output.

Figure 5A:
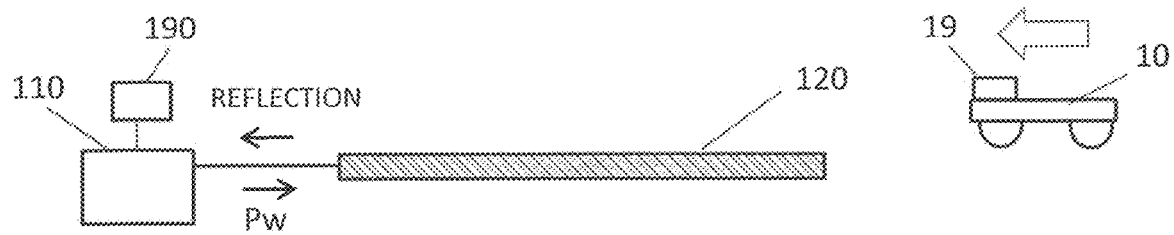
FIG. 5A schematically shows a state where the movable unit 10 is coming near the power transmitting electrodes 120.
Figure 5B:
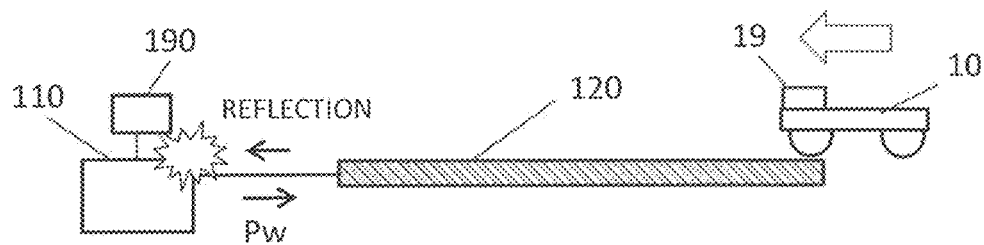
FIG. 5B schematically shows a state where the movable unit 10 has come above the power transmitting electrodes 120.
Figure 5C:
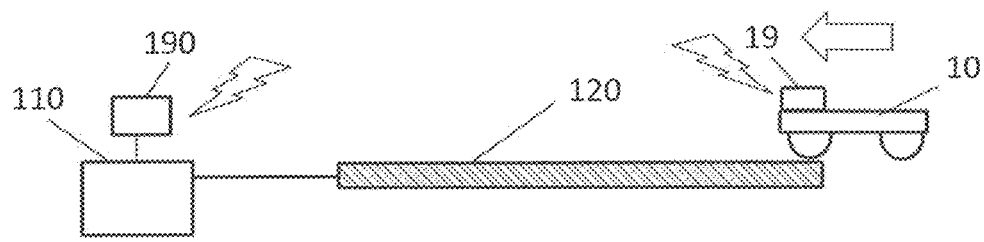
FIG. 5C schematically shows a state where communications are being performed between a second communication device 19 mounted on the movable unit 10 and the power transmitting circuit 110.
Figure 5D:
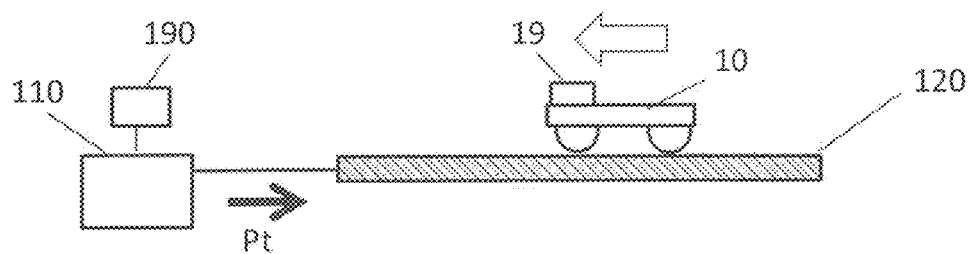
FIG. 5D schematically shows a state where, after establishing communications, power is being transmitted from the power transmitting circuit 110 to the movable unit 10.

FIG. 5A schematically shows a state where the movable unit 10 is coming near the power transmitting electrodes 120. FIG. 5B schematically shows a state where the movable unit 10 has come above the power transmitting electrodes 120. FIG. 5C schematically shows a state where communications are being performed between a second communication device 19 mounted on the movable unit 10 and the first communication device 190. FIG. 5D schematically shows a state where, after establishing communications, power is being transmitted from the power transmitting circuit 110 to the movable unit 10.

In this example, once arriving at the position shown in FIG. 5B from the position shown in FIG. 5A, the second communication device 19 mounted on the movable unit 10 sends a signal requesting power transmission to the first communication device 190, as shown in FIG. 5C. This signal may contain information concerning an identifier (i.e., ID) of the movable unit 10 and concerning the required power, for example. By detecting a change in current, voltage, etc., within the power receiving circuit 210, the movable unit 10 is able to detect that the power receiving electrodes 220 have begun to be opposed to the power transmitting electrodes 120. Once the first communication device 190 receives the power transmission request from the movable unit 10, as shown in FIG. 5D, the power transmitting circuit 110 increases the output power to an power Pt to be directed to power transmission, and begins power transmission.

Through such operation, power transmission can be begun without making a misrecognition even if an object different from the movable unit 10 approaches the power transmitting electrodes 120.

However, such a solution requires a relatively long time to establish a connection and to process signal exchanges between the movable unit 10 and the power transmitting circuit 110. In order to establish a connection, bidirectional communications need to be performed between the first communication device 190 and the second communication device 19 mounted on the movable unit 10. Moreover, after establishing a connection, time is also taken for the movable unit 10 to send a signal of e.g. several bits or more to the first communication device 190, and for a control circuit within the power transmitting device 100 to decode that signal. This causes a problem of delayed start of power transmission. In particular, in an implementation where the movable unit 10 is to be charged while moving along the power transmitting electrodes 120, the overall charging time may considerably decrease if the start of power transmission is delayed because of the time needed to make a determination based on communications. This problem may similarly arise, not only with respect to AGVs, but also in the case where non-contact power feeding is applied to other movable units such as elevators. This problem will become especially serious as the moving velocity becomes more rapid.

The inventors have identified the above problems, and explored configurations for solving the above problems. As a result, the inventors have found that the above problems can be solved by adopting the following configurations.

A wireless power transmission system according to one implementation of the present disclosure comprises:

a power transmitting device; and a power receiving device, the power transmitting device including:

a first conversion circuit to convert power supplied from a first power source into charging power to be directed to charging in the power receiving device;

a power transmitting antenna to send out the charging power which is output from the first conversion circuit;

a first control circuit to control the first conversion circuit; and a first detection circuit to detect a fluctuation in current and/or voltage at a point on a transmission line from the first power source to the power transmitting antenna, the power receiving device including:

a power receiving antenna to receive the charging power which is sent out from the power transmitting antenna;

a power receiving circuit to convert the charging power received by the power receiving antenna into an AC power of a frequency different from that of the charging power or DC power, and to supply the AC power or the DC power to a load; and a trigger application circuit to apply a trigger signal for informing the power transmitting device of presence of the power receiving device onto detecting power which is supplied from the power transmitting antenna side or the power receiving circuit side to the power receiving antenna, wherein, while the detecting power having the trigger signal applied thereto is supplied to the power receiving antenna, upon detecting the trigger signal based on a result of detection by the first detection circuit, the first control circuit causes the first conversion circuit to begin outputting the charging power.

In accordance with the above implementation, the power receiving device includes a trigger application circuit to apply a trigger signal onto detecting power which is supplied from the power transmitting antenna side or the power receiving circuit side to the power receiving antenna. While the detecting power having the trigger signal applied thereto is supplied to the power receiving antenna, upon detecting the trigger signal based on a result of detection by the first detection circuit, the first control circuit causes the first conversion circuit to begin outputting the charging power.

With such configuration, transmission of the charging power can be begun with appropriate timing, without any object other than the power receiving device being misrecognized to be the power receiving device. Moreover, less time will be needed until beginning power transmission than by a configuration where communications are to be performed between the power receiving device and the power transmitting device.

In the present specification, charging power may be referred to as "first AC power", whereas detecting power may be referred to as "second AC power.

In an embodiment of the present disclosure, the detecting power differs from the charging power to be directed to power transmission, and is used for the power transmitting device to detect the presence of the power receiving device. The detecting power may be generated by the power transmitting device, or generated by the power receiving device.

In an implementation where the detecting power is generated by the power receiving device, the power receiving device further includes a second conversion circuit to convert power supplied from a second power source into the detecting power and supply the detecting power to the power receiving antenna, and a second control circuit to control the second conversion circuit. The second control circuit causes the second conversion circuit to output the detecting power in a state where the first conversion circuit is not outputting the charging power. The trigger application circuit applies the trigger signal to the detecting power which is output from the second conversion circuit.

With such configuration, the detecting power and a trigger signal for informing of the presence of the power receiving device is sent from the power receiving device to the power transmitting device. Without transmitting from the power transmitting device a detecting power which is different from the charging power to be directed to power transmission, the aforementioned effects can be obtained.

In an implementation where the detecting power is generated by the power transmitting device, the detecting power is supplied from the first conversion circuit to the power receiving antenna via the power transmitting antenna. In a state of causing the first conversion circuit to output the detecting power, upon detecting the trigger signal based on a result of detection by the first detection circuit, the first control circuit causes the first conversion circuit to stop outputting the detecting power and begin outputting the charging power.

With such configuration, without providing in the power receiving device a second conversion circuit to generate the detecting power, the aforementioned effects can be obtained.

Each of the first power source and the second power source may be a DC power source or an AC power source. Each power source may be a power source which outputs AC power of a low frequency (e.g. 50 Hz or 60 Hz) such as mains power supply, for example. In the case where the first power source is a DC power source, the first conversion circuit may be an inverter circuit that converts DC power which is output from the first power source into the charging power or the detecting power. Similarly, in the case where the second power source is a DC power source, the second conversion circuit may be an inverter circuit that converts DC power which is output from the second power source into the detecting power. Each of the first conversion circuit and the second conversion circuit may be a circuit that converts AC power which is input from the AC power source into an AC power of a different frequency or voltage.

In an implementation where the detecting power is generated by the power receiving device, the second conversion circuit may include a plurality of switching elements. The second control circuit causes the detecting power to be output from the second conversion circuit by supplying a control signal to each of the plurality of switching elements. The trigger application circuit can apply the trigger signal to the detecting power by superposing a signal of a lower frequency than a frequency of the control signal onto the control signal supplied from the second control circuit to the second conversion circuit.

The trigger application circuit may include an impedance element and a switch which are placed under a shunting condition at a point on a transmission line between the power receiving antenna and the load. By controlling ON and OFF states of the switch, the trigger signal can be generated.

The impedance element may include at least one of a resistor, an inductor, and a capacitor, for example. To be "placed under a shunting condition" means being connected to a transmission line in a manner of causing a current flowing in the transmission line to flow into divided paths. For example, the impedance element may be connected in parallel to the power receiving antenna or the power receiving circuit.

The power receiving device may further include a second detection circuit to detect a fluctuation in current and/or voltage at a point on a transmission line from the power receiving antenna to the load, or between the second conversion circuit and the second power source. The second control circuit may cause the second conversion circuit to output the detecting power, and thereafter, before the power receiving antenna becomes opposed to the power transmitting antenna, or upon determining that the power receiving antenna has moved to a position opposed to the power transmitting antenna based on a result of detection by the second detection circuit, cause the trigger application circuit to apply the trigger signal. The second control circuit may, after beginning outputting of the detecting power and application of the trigger signal, and before the charging power is output from the first conversion circuit in a state where the power receiving antenna is opposed to the power transmitting antenna, cause the second conversion circuit to stop outputting the detecting power and cause the trigger application circuit to stop application of the trigger signal.

As a result, before transmission of the charging power is begun, outputting of the detecting power from the power receiving device and application of a trigger signal can be stopped. Furthermore, switches may be provided at the respective points of connection between the second conversion circuit and trigger application circuit and the transmission path of the charging power. In that case, during transmission of the charging power, the second conversion circuit and the trigger application circuit can be kept isolated from the current path of the charging power. For example, the second control circuit may turn the switches OFF when stopping outputting of the detecting power and application of a trigger signal. This can prevent a large current associated with the charging power from flowing into the second conversion circuit and the trigger application circuit. This can enhance safety of the circuitry within the power receiving device.

The load may include a charge storing device, such as a secondary battery or a capacitor. When a remaining energy amount in the charge storing device is greater than a predetermined value, the second control circuit may stop operation of the second conversion circuit and the trigger application circuit. As a result, an unnecessary charge operation can be prevented from being begun when there is a sufficient remaining energy amount in the charge storing device.

In an implementation where the power transmitting device generates the detecting power, the first conversion circuit may be divided into a conversion circuit which outputs the charging power to be directed to power transmission and another conversion circuit which outputs the detecting power for detecting the presence of the power receiving circuit. In the present disclosure, the term "first conversion circuit" is used also to encompass such two conversion circuits. The conversion circuit to output the charging power and the conversion circuit to output the detecting power may be connected to different power sources.

The power receiving device may further include a second detection circuit to detect a fluctuation in current and/or voltage at a point on a transmission line from the power receiving antenna to the load. The second control circuit may, before the power receiving antenna becomes opposed to the power transmitting antenna, or upon determining that the power receiving antenna has moved to a position opposed to the power transmitting antenna based on a result of detection by the second detection circuit, cause the trigger application circuit to apply the trigger signal. The second control circuit may, after causing the trigger signal to be applied, and before the charging power is output from the first conversion circuit in a state where the power receiving antenna is opposed to the power transmitting antenna, cause the trigger application circuit to stop application of the trigger signal.

As a result, before transmission of the charging power is begun, outputting of the detecting power from the power receiving device and application of a trigger signal can be stopped. Furthermore, a switch may be provided at a point of connection between the trigger application circuit and the transmission path of the charging power. In that case, during transmission of the charging power, the trigger application circuit can be kept isolated from the current path of the charging power. For example, the second control circuit may turn the switch OFF when stopping application of a trigger signal. As a result, a large current associated with the charging power can be prevented from flowing into the trigger application circuit. This can enhance safety of the circuitry within the power receiving device.

The voltage of the charging power and the voltage of the detecting power may be set to different values. For example, the voltage of the detecting power may be set to a smaller value than that of the voltage of the charging power. The frequency of the detecting power may be set to a value substantially equal to that of the frequency of the charging power. In the present disclosure, two frequencies being "substantially equal" means that a ratio between the two frequencies is not less than 90% and not more than 111%. In one example, the voltage of the detecting power may be not less than 98% and not more than 102% of the voltage of the charging power.

The trigger signal may contain at least one pulse having a duration longer than a period of the detecting power.

After the current and/or voltage detected by the first detection circuit begins to fluctuate in response to application of the trigger signal, the first control circuit may determine, before a time equivalent to one period of the fluctuation elapses, that the trigger signal has been applied, and cause the first conversion circuit to begin outputting the charging power.

The trigger signal may be a signal containing a frequency component of the charging power. When a waveform of a fluctuation in the current and/or voltage detected by the first detection circuit contains a frequency component of the charging power, the first control circuit may determine that the trigger signal has been applied, and cause the first conversion circuit to begin outputting the charging power.

The first detection circuit may include a filter circuit which selectively passes a signal of the frequency of the charging power, the filter circuit being disposed at a point on the transmission line from the DC power source to the power transmitting antenna. The filter circuit may include, at least one of a low-pass filter, a high-pass filter, and a band-pass filter, for example.

Each of the power transmitting antenna and the power receiving antenna according to the present disclosure is an element for transmitting power via magnetic-field coupling or electric-field coupling. In one embodiment, the power transmitting antenna includes a pair of power transmitting electrodes having a shape that is elongated in one direction, and the power receiving antenna includes a pair of power receiving electrodes which become opposed to the pair of power transmitting electrodes when receiving the charging power from the power transmitting antenna. In such configuration, power is transmitted via electric-field coupling between the pair of power transmitting electrodes and the pair of power receiving electrodes. Each of the power transmitting antenna and the power receiving antenna may be an electrode group which includes three or more electrodes. In that case, voltages of opposite phases, for example, may be applied to any two adjacent electrodes in the electrode group. In such configuration, a leakage field above the interspace between the electrodes can be suppressed. Each of the power transmitting antenna and the power receiving antenna may be a coil (i.e., an inductor), rather than an electrode. In that case, power is transmitted via magnetic-field coupling between a power transmitting coil and a power receiving coil.

The power receiving device may be mounted on a movable unit, for example. In the present disclosure, "movable unit" refers to any movable object to be driven by power. Movable units may include, for example, an electric vehicle that includes an electric motor and one or more wheels. Such a vehicle may be the aforementioned automated guided vehicle, a forklift, an Overhead Hoist Transfer (OHT), an electric vehicle (EV), an electric cart, or an electric wheelchair, for example. In the present disclosure, a "movable unit" is also inclusive of any movable object that does not have wheels. For example, bipedal robots, Unmanned Aerial Vehicles (UAV, so-called drones) such as multicopters, manned electric aerial vehicles, and elevators are also encompassed within "movable units".

Hereinafter, more specific embodiments of the present disclosure will be described. Note however that unnecessarily detailed descriptions may be omitted. For example, detailed descriptions on what is well known in the art or redundant descriptions on what is substantially the same construction may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, identical or similar constituent elements are denoted by identical reference numerals.

Embodiments

Figure 6A:
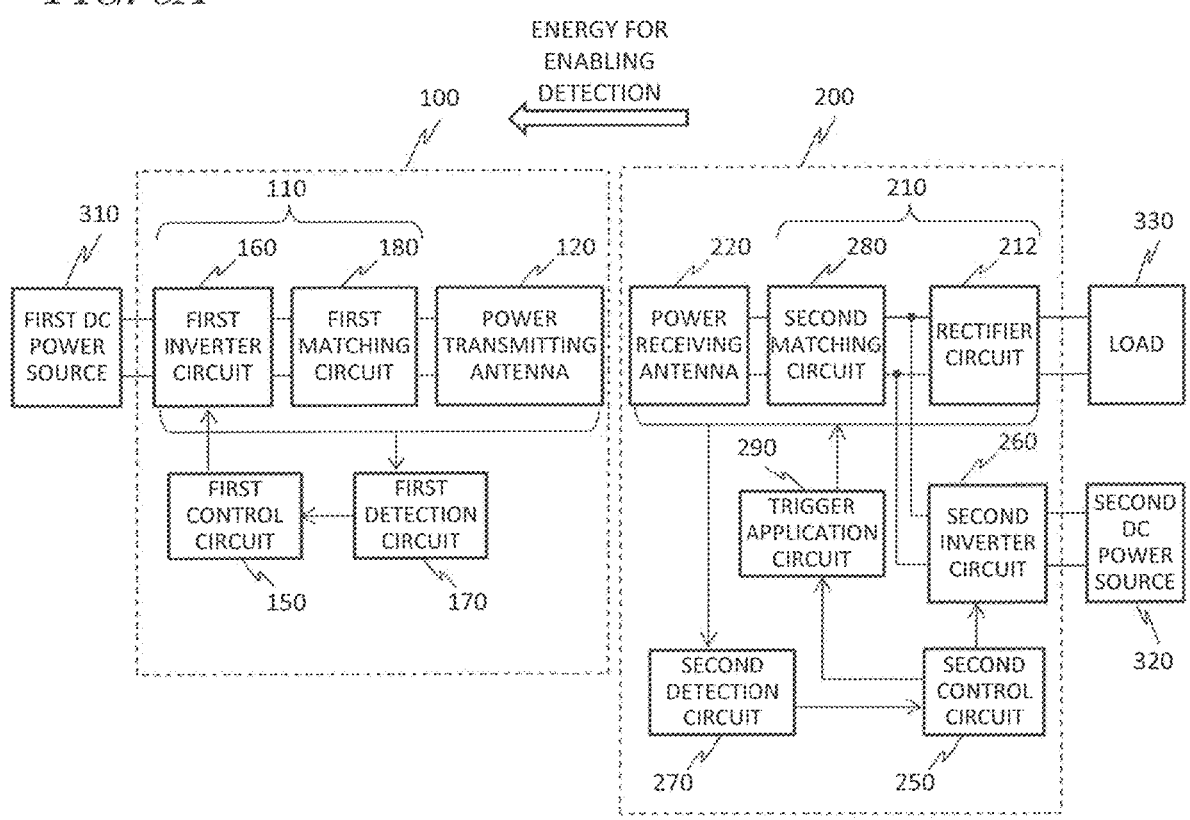
FIG. 6A is a block diagram showing the configuration of a wireless power transmission system according to an illustrative embodiment of the present disclosure.

FIG. 6A is a block diagram showing the configuration of a wireless power transmission system according to an illustrative embodiment of the present disclosure. This wireless power transmission system includes a power transmitting device 100 and a power receiving device 200. FIG. 6 also shows a first DC power source 310, a load 330, and a second DC power source 320, which are external elements to the power transmitting device 100 and the power receiving device 200. The first DC power source 310 may be included within the power transmitting device 100. The load 330 and the second DC power source 320 may be included within the power receiving device 200.

In the present embodiment, the first DC power source 310 is being used as an example of a first power source, and the second DC power source 320 is being used as an example of a second power source. Moreover, a first inverter circuit 160 is used as an example of a first conversion circuit, and a second inverter circuit 260 is used as an example of a second conversion circuit. The configuration according to the present embodiment is similarly applicable to the case where each of the first power source and the second power source is an AC power source. In the case where the first power source is an AC power source, an AC-to-AC conversion circuit is used instead of the first inverter circuit. Similarly, in the case where the second power source is an AC power source, an AC-to-AC conversion circuit is used instead of the second inverter circuit.

The power transmitting device 100 according to the present embodiment includes a power transmitting circuit 110, a power transmitting antenna 120, a first control circuit 150, and a first detection circuit 170. The power transmitting circuit 110 includes the first inverter circuit 160 and a first matching circuit 180.

The power transmitting antenna 120 is indirectly connected the first inverter circuit 160 via the first matching circuit 180. In the case where the first matching circuit 180 is omitted, the power transmitting antenna 120 may be directly connected to the first inverter circuit 160. The power transmitting antenna 120 sends out first AC power, which is output from the first inverter circuit 160, into space. The power transmitting antenna 120 includes two or more power transmitting electrodes or one or more power transmitting coils, for example. The present disclosure mainly illustrates an example where the power transmitting antenna 120 includes two power transmitting electrodes, as shown in FIG. 1. In the present specification, the reference numeral "120" is employed for both of the power transmitting antenna and the power transmitting electrodes.

The first inverter circuit 160 is connected to the first DC power source 310. The first inverter circuit 160 converts first DC power, which is supplied from the first DC power source 310, into a first AC power to be directed to power transmission for output. The first inverter circuit 160 has the circuit configuration of a full bridge inverter or a half bridge inverter, for example. The first inverter circuit 160 includes a plurality of switching elements. By toggling between ON/OFF of each switching element, input DC power can be converted into AC power for output. The first inverter circuit 160 operates under the control of the first control circuit 150.

The first matching circuit 180 is connected between the first inverter circuit 160 and the power transmitting antenna 120. The first matching circuit 180 improves the degree of impedance matching between the first inverter circuit 160 and the power transmitting antenna 120. The first matching circuit 180 may be omitted if not needed.

The first control circuit 150 is connected to the first inverter circuit 160. The first control circuit 150 controls the first inverter circuit 160. The first control circuit 150 supplies to each switching element of the first inverter circuit 160 a control signal for toggling between ON/OFF of the respective switching element. As a result of this, the first control circuit 150 allows a desired AC power to be output from the first inverter circuit 160. The first control circuit 150 may include a gate driver circuit and a controller to control the gate driver circuit, for example. The first control circuit 150 may be implemented by an integrated circuit which includes a processor and a memory, e.g., a microcontroller unit (MCU), for example.

The first detection circuit 170 detects a fluctuation in current and/or voltage at a point on a transmission line from the first DC power source 310 to the power transmitting antenna 120. The first detection circuit 170 may be inserted at any point between the first DC power source 310 and the first inverter circuit 160, or between the first inverter circuit 160 and the power transmitting antenna 120, for example.

Figure 6B:
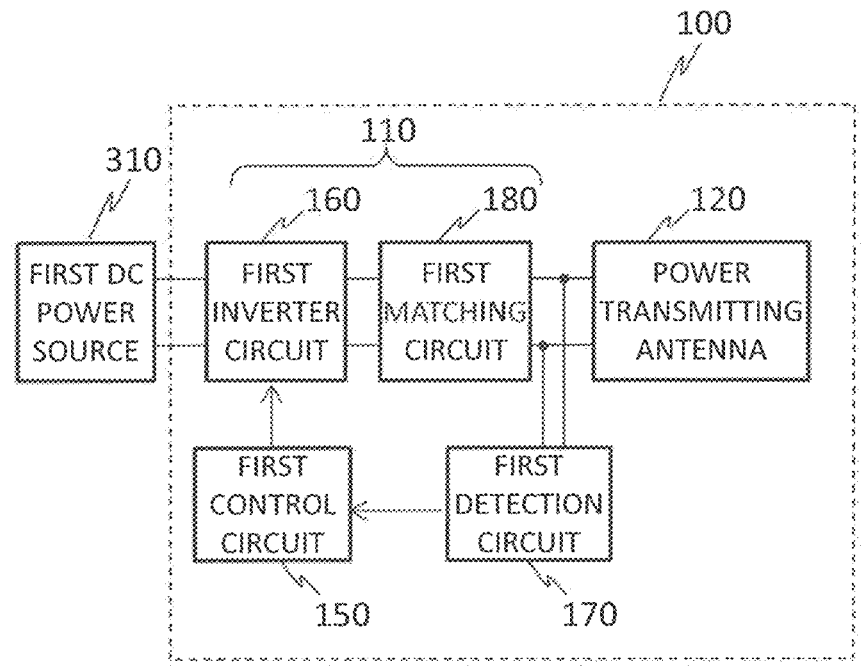
FIG. 6B shows a first example of the positioning of a first detection circuit in a power transmitting device.
Figure 6C:
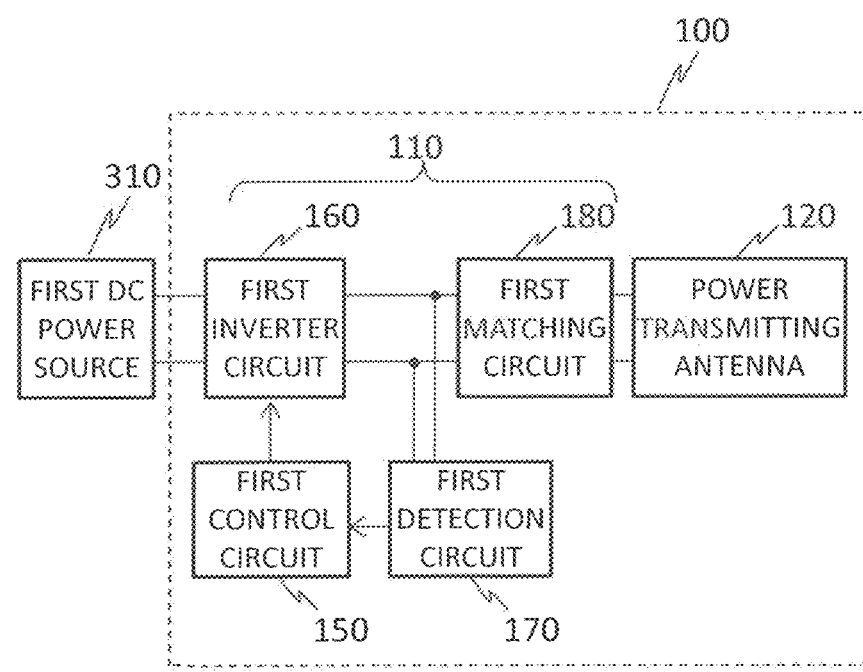
FIG. 6C is a diagram showing a second example of the positioning of a first detection circuit in a power transmitting device.
Figure 6D:
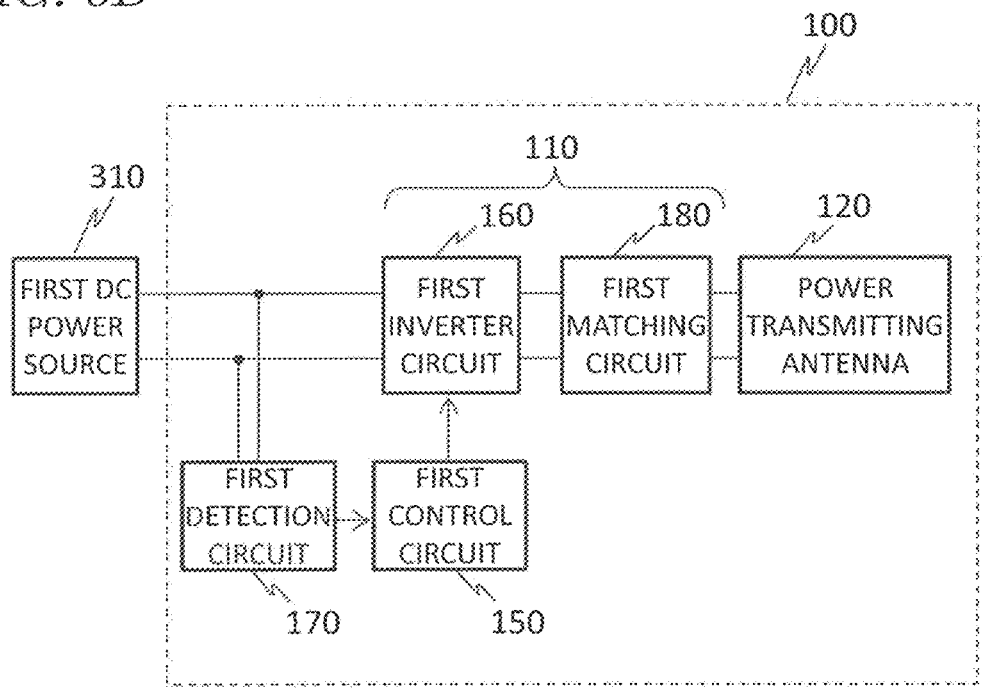
FIG. 6D is a diagram showing a third example of the positioning of a first detection circuit in a power transmitting device.

FIG. 6B through FIG. 6D are diagrams showing example manners of connecting a second detection circuit 270. As shown in these figures, the manner of connecting the first detection circuit 170 may be various.

FIG. 6B shows an example of a power transmitting device 100 in which the first detection circuit 170 is connected to a transmission line between the first matching circuit 180 and the power transmitting antenna 120. With such configuration, it is possible to detect a fluctuation in the AC current and/or voltage obtained through conversion by the first matching circuit 180.

FIG. 6C shows an example of a power transmitting device 100 in which the first detection circuit 170 is connected to a transmission line between the first inverter circuit 160 and the first matching circuit 180. With such configuration, it is possible to detect a fluctuation in the AC current and/or voltage which is output from the first inverter circuit 160.

FIG. 6D shows an example of a power transmitting device 100 in which the first detection circuit 170 is connected to a transmission line between the first DC power source 310 and the first inverter circuit 160. With such configuration, it is possible to detect a fluctuation in the DC current and/or voltage which is output from the first DC power source 310.

Some or all functions of the first detection circuit 170 and the first control circuit 150 may be implemented in one piece of hardware.

The power receiving device 200 may be mounted to a movable unit 10 as shown in FIG. 1, for example. As shown in FIG. 6A, the power receiving device 200 includes a power receiving antenna 220, a power receiving circuit 210, a second inverter circuit 260, a second control circuit 250, a trigger application circuit 290, and the second detection circuit 270. The power receiving circuit 210 includes a second matching circuit 280 and a rectifier circuit 212.

The power receiving antenna 220 electromagnetically couples to the power transmitting antenna 120, and receives the first AC power which is sent out from the power transmitting antenna 120. The power receiving antenna 220 includes two or more power receiving electrodes or one or more power receiving coils, for example. In the present disclosure, as shown in FIG. 2, an example where the power receiving antenna 220 includes two power receiving electrodes will be mainly described. In the present specification, the reference numeral "220" is used for both of the power receiving antenna and the power receiving electrode.

The rectifier circuit 212 is indirectly connected to the power receiving antenna 220 via the second matching circuit 280. In the case where the second matching circuit 280 is omitted, the rectifier circuit 212 may be directly connected to the power receiving antenna 220. The rectifier circuit 212 converts the first AC power which has been received by the power receiving antenna 220 into DC power, and supplies it to the load 330. In the case where the load 330 is driven by AC power, instead of the rectifier circuit 212, an AC-to-AC conversion circuit may be used. In the case where the load 330 is a device such as a motor that is driven by a three-phase current, the power receiving circuit 210 may include a three-phase inverter. Thus, the power receiving circuit 210 converts the first AC power into an AC power that is different from the first AC power or into DC power, and supplies it to the load 330. The power receiving circuit 210 may also be called a power conversion circuit.

The second matching circuit 280 is connected between the power receiving antenna 220 and the power receiving circuit 210. The second matching circuit 280 improves the degree of impedance matching between the power receiving antenna 220 and the power receiving circuit 210. The second matching circuit 280 may be omitted if not needed.

The second inverter circuit 260 is connected directly, or indirectly via a switch or other element or a circuit, to the power receiving antenna 220. The second inverter circuit 260 converts the second DC power which is supplied from the second DC power source 320 into second AC power, and supplies it to the power receiving antenna 220. As will be described later, the second AC power is used to inform the power transmitting device 100 of the presence of the power receiving device 200. The second inverter circuit 260 has the circuit configuration of a full bridge inverter or a half bridge inverter, for example. The second inverter circuit 260 includes a plurality of switching elements. By toggling between ON/OFF of each switching element, the input DC power can be converted into AC power for output. The second inverter circuit 260 operates under the control of the second control circuit 250.

The second control circuit 250 is connected to the second inverter circuit 260. The second control circuit 250 controls the second inverter circuit 260. The second control circuit 250 supplies to each switching element of the second inverter circuit 260 a control signal for toggling between ON/OFF of the respective switching element. As a result of this, the second control circuit 250 allows a desired AC power to be output from the second inverter circuit 260. The second control circuit 250 may include a gate driver circuit and a controller to control the gate driver circuit, for example. The second control circuit 250 may be implemented by an integrated circuit which includes a processor and a memory, e.g., a microcontroller unit (MCU), for example.

The trigger application circuit 290 applies a trigger signal to the second AC power which is output from the second inverter circuit 260. For example, on a control signal that is supplied from the second control circuit 250 to each switching element of the second inverter circuit 260, the trigger application circuit 290 may superpose a signal of a lower frequency than the frequency of the control signal, thus being able to apply a trigger signal to the second AC power. The trigger application circuit 290 may include an impedance element, e.g., a shunt resistor, that is disposed at a point on a transmission line between the power receiving antenna 220 and the load 330, and a switch. By controlling the switch to be ON or OFF, a trigger signal can be generated. The trigger signal may contain at least one pulse having a duration which is longer than the period of the second AC power, for example. The trigger signal may be a signal having a different period from the period of the second AC power. For example, the trigger signal may be a signal having a component of a lower frequency than the frequency of the second AC power.

The second detection circuit 270 detects a fluctuation in the current and/or voltage at a point on a transmission line from the power receiving antenna 220 to the load 330. The second detection circuit 270 may be inserted at any point between the power receiving antenna 220 and the power receiving circuit 210, or between the power receiving circuit 210 and the load 330, for example.

Figure 6E:
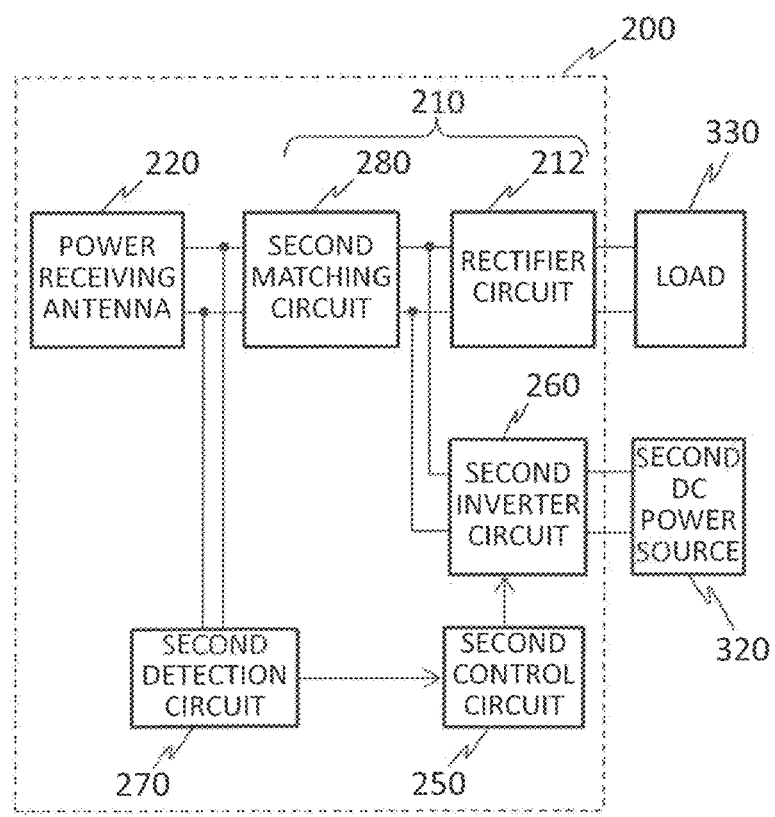
FIG. 6E is a diagram showing a first example of the positioning of a second detection circuit in a power receiving device.
Figure 6F:
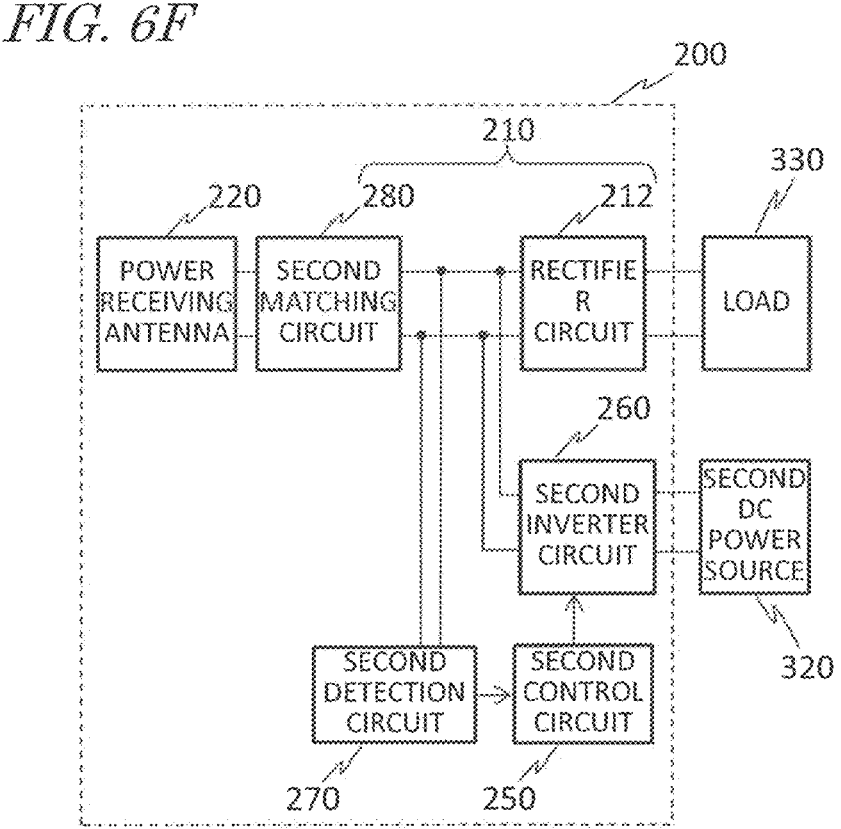
FIG. 6F is a diagram showing a second example of the positioning of a second detection circuit in a power receiving device.
Figure 6G:
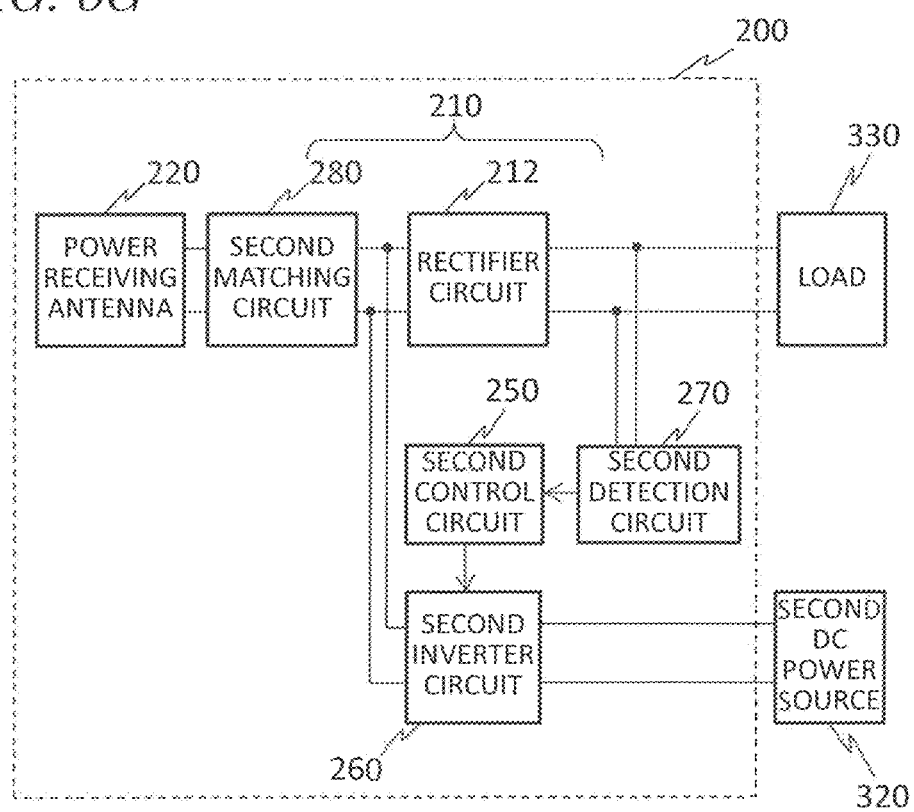
FIG. 6G is a diagram showing a third example of the positioning of a second detection circuit in a power receiving device.

FIG. 6E through FIG. 6G are diagrams showing example manners of connecting the second detection circuit 270. For ease of viewing, the trigger application circuit 290 is omitted from illustration in FIG. 6E through FIG. 6G. As shown in these figures, the manner of connecting the second detection circuit 270 may be various.

FIG. 6E shows an example of a power receiving device 200 in which the second detection circuit 270 is connected to a transmission line between the power receiving antenna 220 and the second matching circuit 280. With such configuration, it is possible to detect a fluctuation in the AC current and/or voltage which is received by the power receiving antenna 220.

FIG. 6F shows an example of a power receiving device 200 in which the second detection circuit 270 is connected to a transmission line between the second matching circuit 280 and the rectifier circuit 212. With such configuration, it is possible to detect a fluctuation in the AC current and/or voltage obtained through conversion by the second matching circuit.

FIG. 6G shows an example of a power receiving device 200 in which the second detection circuit 270 is connected to a transmission line between the rectifier circuit 212 and the load 330. With such configuration, it is possible to detect a fluctuation in the DC current and/or voltage having been rectified by the rectifier circuit 212.

Some or all functions of the second control circuit 250, the trigger application circuit 290, and the second detection circuit 270 may be implemented in one piece of hardware.

FIG. 6A is referred to again. The second control circuit 250 and the trigger application circuit 290 perform an operation based on a result of detection by the second detection circuit 270. For example, the second control circuit 250 and the trigger application circuit 290 may begin their respective operations upon detecting that the power receiving antenna 220 and the power transmitting antenna 120 have begun to be opposed to each other, based on a result of detection by the second detection circuit 270.

Alternatively, the second control circuit 250 and the trigger application circuit 290 may begin their respective operations before the power receiving antenna 220 and the power transmitting antenna 120 become at least partially opposed to each other. For example, the power receiving device 200 may approach the power transmitting antenna 120 while outputting the second AC power, and upon detecting that the power receiving antenna 220 and the power transmitting antenna 120 have begun to be opposed to each other, begin application of a trigger signal. Alternatively, the power receiving device 200 may approach the power transmitting antenna 120 while outputting the second AC power to which a trigger signal has been applied.

In a state where the first inverter circuit 160 is not outputting the first AC power, the second control circuit 250 causes the second inverter circuit 260 to output the second AC power, and causes the trigger application circuit 290 to apply a trigger signal. The first control circuit 150 detects the trigger signal based on the result of detection by the first detection circuit 170. Upon detecting the trigger signal, the first control circuit 150 causes the first inverter circuit 160 to begin outputting the first AC power.

In the present embodiment, when approaching the power transmitting antenna 120 for charging, the power receiving device 200 supplies to the power transmitting device 100 the second AC power as an energy for enabling detection. A trigger signal is superposed on the second AC power. Once the power receiving antenna 220 begins to enter an area where charging is possible, the detection intensity of the trigger signal begins to increase within the power transmitting device 100. The power transmitting device 100 detects this trigger signal. As a result, without misrecognizing it as a foreign object, the power transmitting device 100 is able to detect, in a very short time, the power transmitting antenna 120 and the power receiving antenna 220 becoming opposed to each other (which hereinafter may also be referred to as "crossing").

Figure 7:
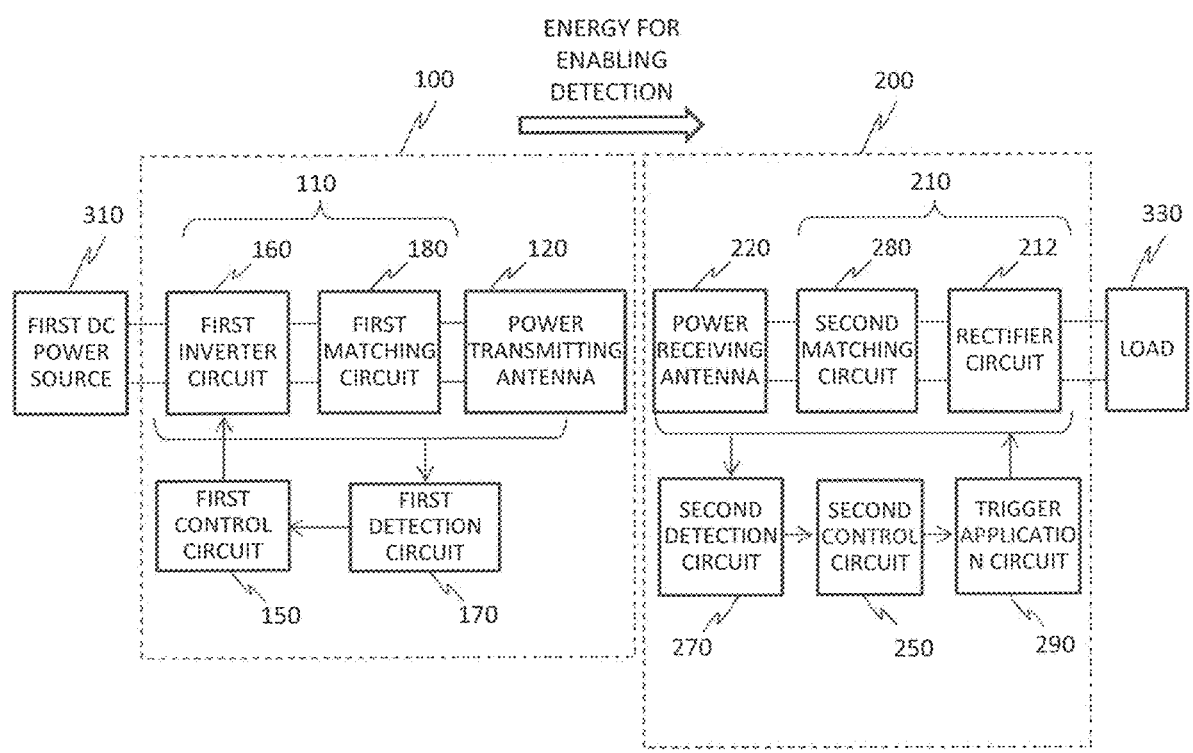
FIG. 7 is a block diagram showing the configuration of a wireless power transmission system according to another embodiment of the present disclosure.

FIG. 7 is a block diagram showing the configuration of a wireless power transmission system according to another embodiment of the present disclosure. This wireless power transmission system differs from the configuration of FIG. 6A in that an energy for enabling detection is supplied from the power transmitting device 100 to the power receiving device 200. Hereinafter, differences from the configuration of FIG. 6A will mainly be described.

In the configuration of FIG. 7, the power receiving device 200 lacks the second inverter circuit 260. The second AC power, which is an energy for enabling detection, is output from the first inverter circuit 160 in the power transmitting device 100. In other words, the first inverter circuit 160 outputs not only the first AC power to be directed to power transmission, but also the second AC power with which to detect the presence of the power receiving device 200. The trigger application circuit 290 in the power receiving device 200 applies a trigger signal to the second AC power which is sent from the power transmitting device 100. Based on a change in the current and/or voltage in the power transmitting device 100 as detected by the first detection circuit 170, the first control circuit 150 in the power transmitting device 100 detects the trigger signal. Upon detecting the trigger signal, the first control circuit 150 determines that the power receiving antenna 220 has begun to cross the power transmitting antenna 120. In that case, the first control circuit 150 causes the first inverter circuit 160 to stop outputting the second AC power for enabling detection, and begin outputting the first AC power to be directed to power transmission.

Thus, in the embodiment shown in FIG. 7, once the power receiving antenna 220 begins to enter the area where charging is possible, a trigger signal is superposed from the power receiving device 200 onto the energy for enabling detection which is supplied from the power transmitting device 100 to the power receiving device 200. As the power transmitting device 100 detects this trigger signal, crossing of the power transmitting antenna 120 and the power receiving antenna 220 can be detected in a very short time, without it being misrecognized as a foreign object.

Although not shown in FIG. 6A or FIG. 7, a switch may be provided at a point of connection between the trigger application circuit 290 and the transmission path of the first AC power. In the configuration of FIG. 6A, a switch may also be provided at a point of connection between the second inverter circuit 260 and the transmission path of the first AC power. Each switch may be controlled by the second control circuit 250 to be ON during a detection operation of the power receiving device 200, and to be OFF during power transmission. This can prevent a large current from flowing into the trigger application circuit 290 and the second inverter circuit 260 during power transmission (i.e., during transmission of the first AC power).

Next, an example configuration of the trigger application circuit 290 in the power receiving device 200 will be described.

Figure 8A:
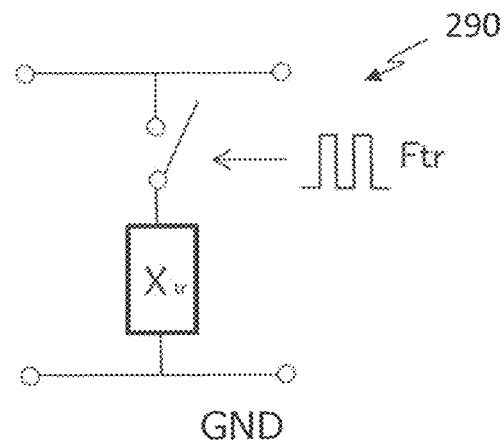
FIG. 8A is a diagram showing a first example of a trigger application circuit 290.

FIG. 8A is a diagram showing a first example of the trigger application circuit 290. In this example, the trigger application circuit 290 includes a series circuit of an impedance element (impedance value: Xtr) and a shunt switch which is placed under a shunting condition, at a point on a transmission line from the power receiving antenna 220 to the load 330. By toggling between the ON state and the OFF state of the shunt switch, a trigger signal can be applied to the detection energy. In FIG. 8A, the block which is represented as an impedance element may be implemented by any one of an inductor element, a capacitor element, and a resistor element, or any combination thereof. The resistance value, inductance value, and/or capacitance value of the respective elements maybe set to appropriate values for effectively attaining the effects of the present embodiment.

The trigger signal may be a periodic pulse signal having a frequency Ftr which is different from the frequency Fo of the second AC power for enabling detection, for example. The frequency Ftr of the trigger signal may be set to a value which is lower than the frequency Fo of the second AC power (e.g., about several kHz to about several ten kHz), for example. Note that the frequency Fo of the second AC power may be set to substantially the same value as the frequency of the first AC power to be directed to power transmission. The frequency Fo may be referred to as a transmission frequency. The transmission frequency Fo may be set to a range from several hundred kHz to several MHz, for example.

During power transmission (i.e., during transmission of the first AC power), the switch for the trigger may be set to OFF. As a result, the current during power transmission can be prevented from flowing into the impedance element.

The configuration of the trigger application circuit 290 shown in FIG. 8A is applicable to both the configuration shown in FIG. 6 and the configuration shown in FIG. 7.

Figure 8B:
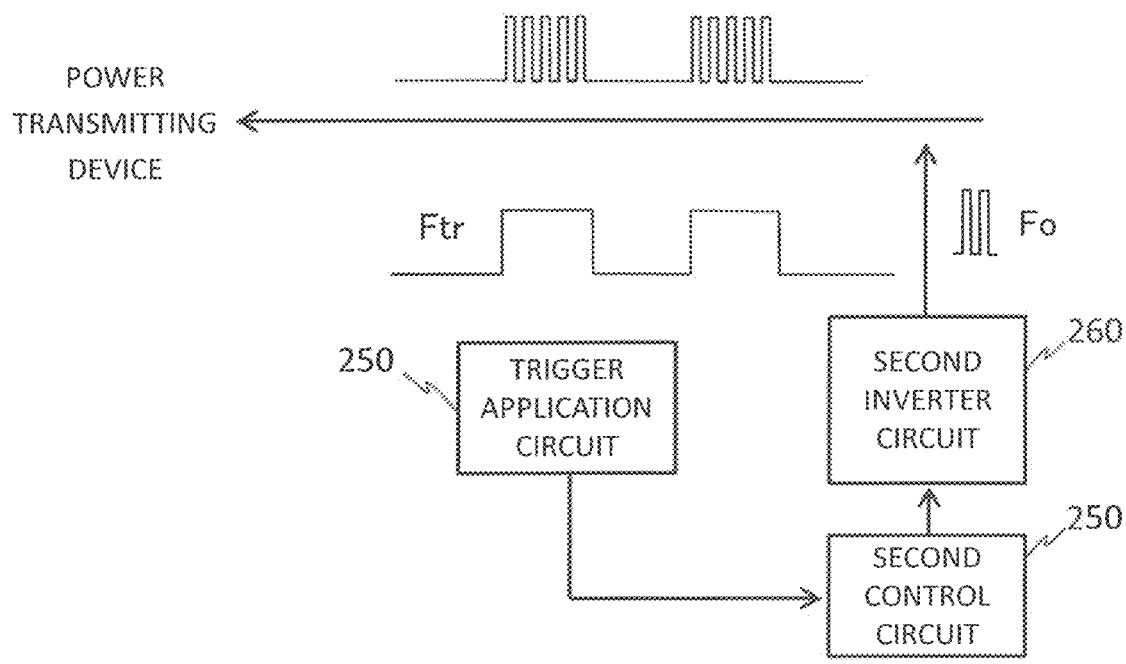
FIG. 8B is a diagram showing a second example of a trigger application circuit 290.

FIG. 8B is a diagram showing a second example of the trigger application circuit 290. This example is applicable to the configuration shown in FIG. 6A. The second inverter circuit 260 outputs the second AC power having the frequency Fo as an energy for enabling detection. The trigger application circuit 290 superposes a trigger signal, having a frequency Ftr which is lower than the frequency Fo, onto the second AC power. As a result, the energy for enabling detection having the trigger signal superposed thereon is supplied to the power transmitting device 100.

Next, an example configuration for trigger detection at the power transmitting device 100 will be described.

Figure 9A:
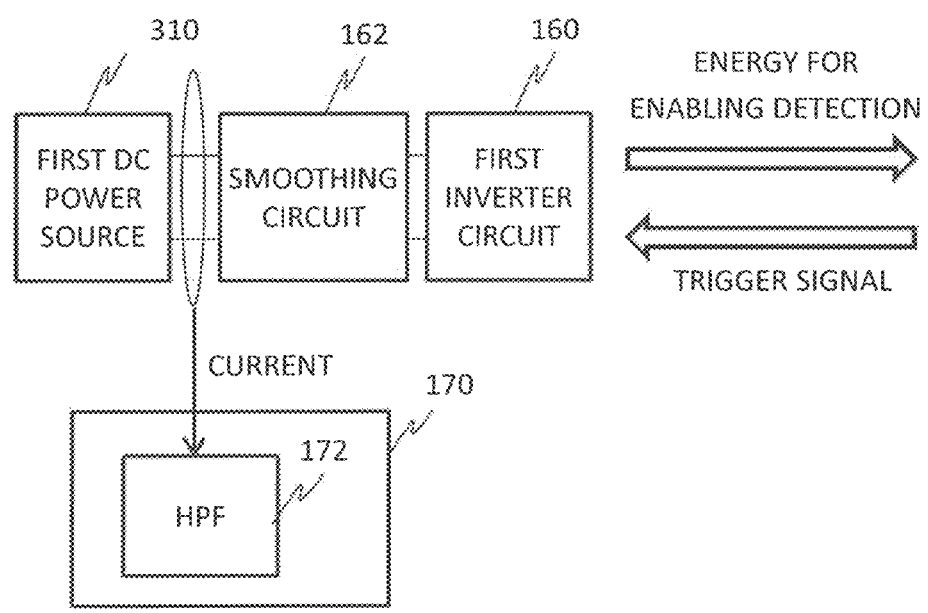
FIG. 9A is a diagram showing a first example of a configuration for trigger detection.

FIG. 9A is a diagram showing a first example of a configuration for trigger detection. In this example, the power transmitting device 100 includes a smoothing circuit 162 between the first DC power source 310 and the first inverter circuit 160. The first detection circuit 170 includes a high-pass filter (HPF) 172. Herein, an example of application to the configuration shown in FIG. 7 will be described.

In order to detect the power receiving device 200, the first inverter circuit 160 outputs second AC power for enabling detection. The second AC power maybe a pulse signal having the frequency Fo, for example. A voltage Vp of the second AC power may be set to a value which is lower than the voltage of the first AC power to be directed to power transmission.

The high-pass filter 172 removes a DC component from the current between the first DC power source 310 and the smoothing circuit 162, thus extracting a high-frequency component of the trigger signal having the frequency Ftr. As a result, the first detection circuit 170 outputs a signal representing a change over time in the current from which the DC component has been removed. Based on this signal, the first control circuit 150 can easily detect the trigger signal having the frequency Ftr.

Note that the positioning of the first detection circuit 170 may be different from the positioning shown in FIG. 9A. For example, the first detection circuit 170 may detect a current between the first inverter circuit 160 and the power transmitting antenna 120. Instead of current, voltage or power may be detected.

In the configuration based on FIG. 7 and FIG. 9A, an inverter circuit to output the first AC power to be directed to power transmission, and an inverter circuit to output the second AC power for detecting the power receiving device 200, may be individually provided. In that case, these two inverter circuits will be collectively referred to as the "first inverter circuits". The voltage of the second AC power may be set to a value which is lower than (e.g., 1/10 or less of) the voltage of the first AC power.

Figure 9B:
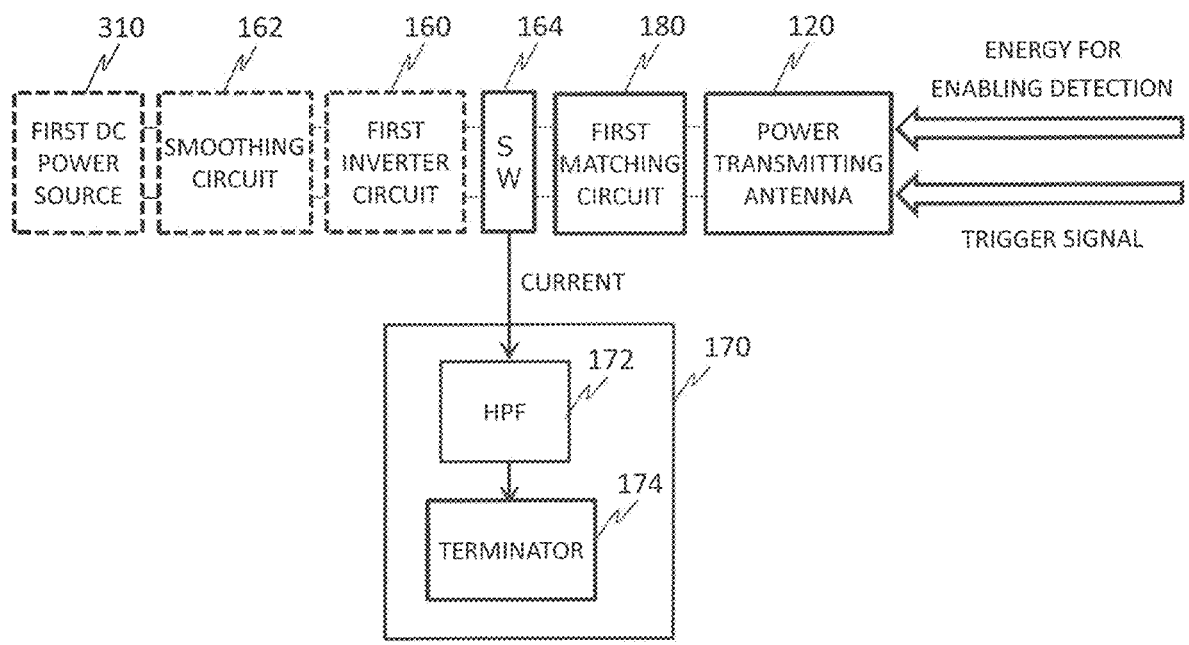
FIG. 9B is a diagram showing a second example of a configuration for trigger detection.

FIG. 9B is a diagram showing a second example of a configuration for trigger detection. This configuration may be applied to the configuration shown in FIG. 6A. In this example, a switch 164 is provided between the first inverter circuit 160 and the first matching circuit 180. Upon detecting the power receiving device 200, the switch 164 disrupts connection between the first inverter circuit 160 and the first matching circuit 180, and connects the detection circuit 170 and the first matching circuit 180. During power transmission, the switch 164 disrupts connection between the detection circuit 170 and the first matching circuit 180, and connects the first inverter circuit 160 and the first matching circuit 180.

In this configuration, when detecting the power receiving device 200, the first DC power source 310, the smoothing circuit 162, and the first inverter circuit 160, which are shown by broken-lined frames in FIG. 9B, do not operate. Therefore, a circuit may be provided that terminates the trigger component in the energy for enabling detection which comes sent from the power receiving device 200. As an example thereof, in the configuration of FIG. 9B, the first detection circuit 170 includes a terminator 174 connected to the HPF 172.

Figure 9C:
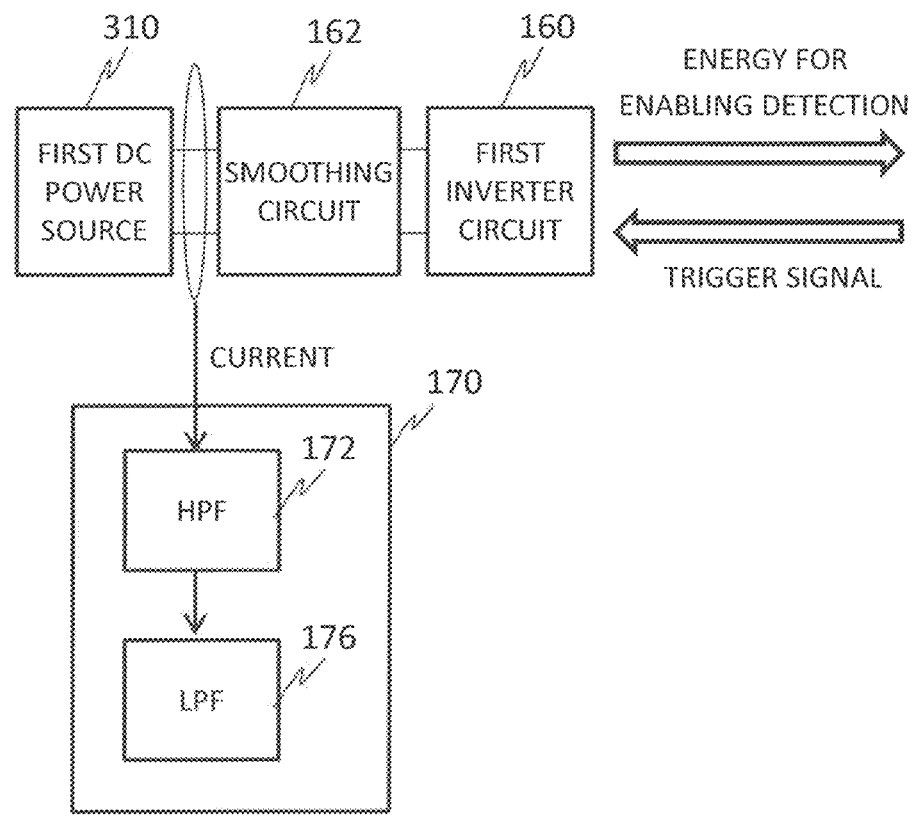
FIG. 9C is a diagram showing a third example of a configuration for trigger detection.

FIG. 9C is a diagram showing a third example of a configuration for trigger detection. This configuration may be applied to the configuration shown in FIG. 7. This example differs from the configuration shown in FIG. 9A in that the first detection circuit 170 includes a low-pass filter (LPF) 176 in addition to the HPF 172. In this example, a DC component and an unwanted high-frequency component of the current are removed with the HPF 172 and the LPF 176, whereby a component of the frequency Ftr is extracted out of the trigger signal. Instead of the HPF 172 and the LPF 176, a band-pass filter may be used.

Figure 9D:
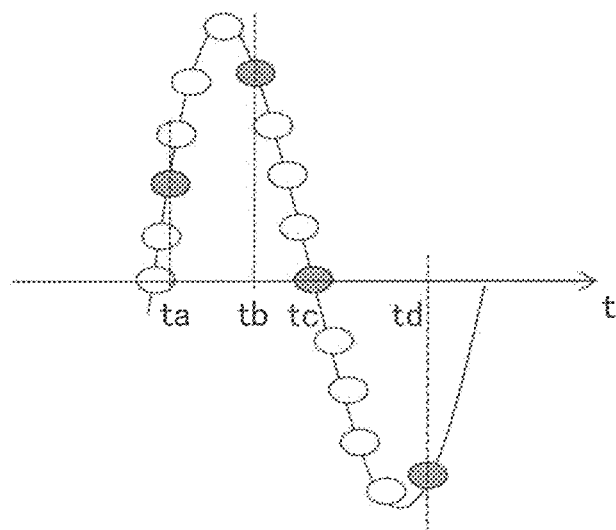
FIG. 9D is a diagram schematically showing the component corresponding to a trigger signal detected in FIG. 9C.

FIG. 9D is a diagram schematically showing the component corresponding to the trigger signal detected in FIG. 9C. In this example, the component corresponding to the trigger signal is a sinusoidal signal. From the output of the first detection circuit 170, the first control circuit 150 extracts the component of the frequency Ftr, thus being able to detect the trigger signal before a time corresponding to one period thereof elapses. For example, the first control circuit 150 can detect the trigger signal through the following operation. First, at a time ta shown in FIG. 9D, arrival of some signal is detected. Next, at a time tb, upon detecting that the maximum point has been passed, the timing thereof is recorded. Furthermore, upon detecting a zero point at the time tc, it is determined whether the time from the maximum point to the zero point coincides with ¼ of the period of the trigger signal or not. Based on this determination, it can be determined whether that signal corresponds to the trigger signal or not. Furthermore, at a time td, it may be confirmed that the minimum point has been passed, thereby allowing for a more certain determination that the signal corresponds to the trigger signal.

Thus, based on the change over time in the component of the frequency Ftr in the current waveform, the first control circuit 150 is able to detect the trigger signal in a shorter time than one period (e.g., on the order of a ¼ period to a half period). Although a case of utilizing a sinusoidal wave is exemplified herein, detection is also possible by utilizing a harmonic of the frequency Ftr.

Next, an example operation of the power receiving device 200 will be described in more detail.

The power receiving devices 200 shown in FIG. 6A and FIG. 7 have the function of detecting that the power receiving antenna 220 and the power transmitting antenna 120 have come to cross each other. This detection is made by using the second detection circuit 270. In the example of FIG. 6A, upon detecting crossing of the antennas from the output of the second detection circuit 270, the second control circuit 250 stops transmission of the second AC power for enabling detection and stops trigger application, before transmission of the first AC power is begun. Furthermore, before transmission of the first AC power is begun, the second control circuit 250 turns OFF switches (not shown) at the respective points of connection between the second inverter circuit 260 and trigger application circuit 290 and the transmission path of the first AC power. On the other hand, in the example of FIG. 7, upon detecting crossing of the antennas, the second control circuit 250 stops trigger application before transmission of the first AC power is begun. Furthermore, before transmission of the first AC power is begun, the second control circuit 250 turns OFF a switch (not shown) at the point of connection between the trigger application circuit 290 and the transmission path of the first AC power. Through such operation, detection of the power receiving device 200 can be properly completed in a short period of time, and transmission of a large power can be begun, without destroying the circuitry in the power receiving device 200.

Figure 10:
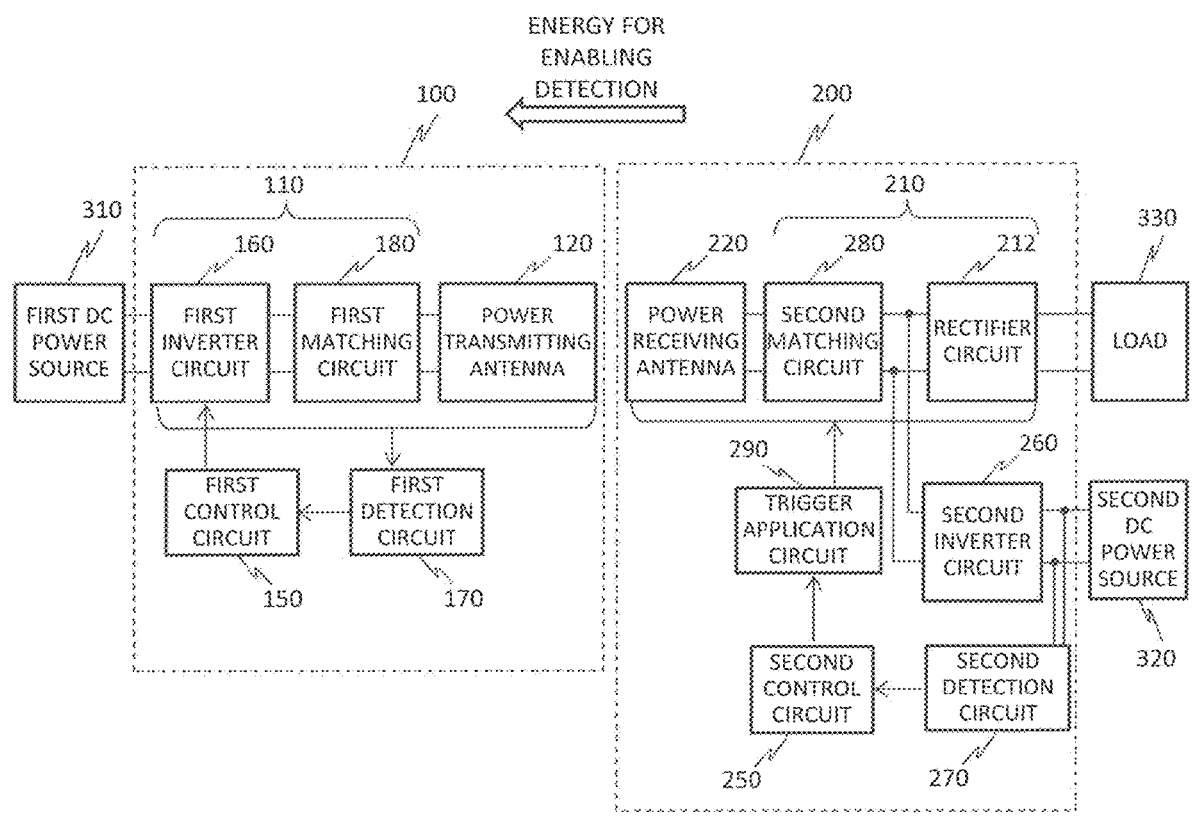
FIG. 10 is a block diagram showing an example configuration where a second detection circuit 270 detects the current and/or voltage between a second inverter circuit 260 and a second DC power source 320.

In the example of FIG. 6A, the second detection circuit 270 detects the current and/or voltage at some point from the power receiving antenna 220 to the load 330. Without being limited to this example, the second detection circuit 270 may detect the current and/or voltage at some point between the second inverter circuit 260 and the second DC power source 320. FIG. 10 is a block diagram showing an example configuration where the second detection circuit 270 detects the current and/or voltage between the second inverter circuit 260 and the second DC power source 320. It is possible to adopt this configuration shown in FIG. 10.

Next, with reference to FIG. 11A through FIG. 12B, operations according to the present embodiment will be described in more detail.

Figure 11A:
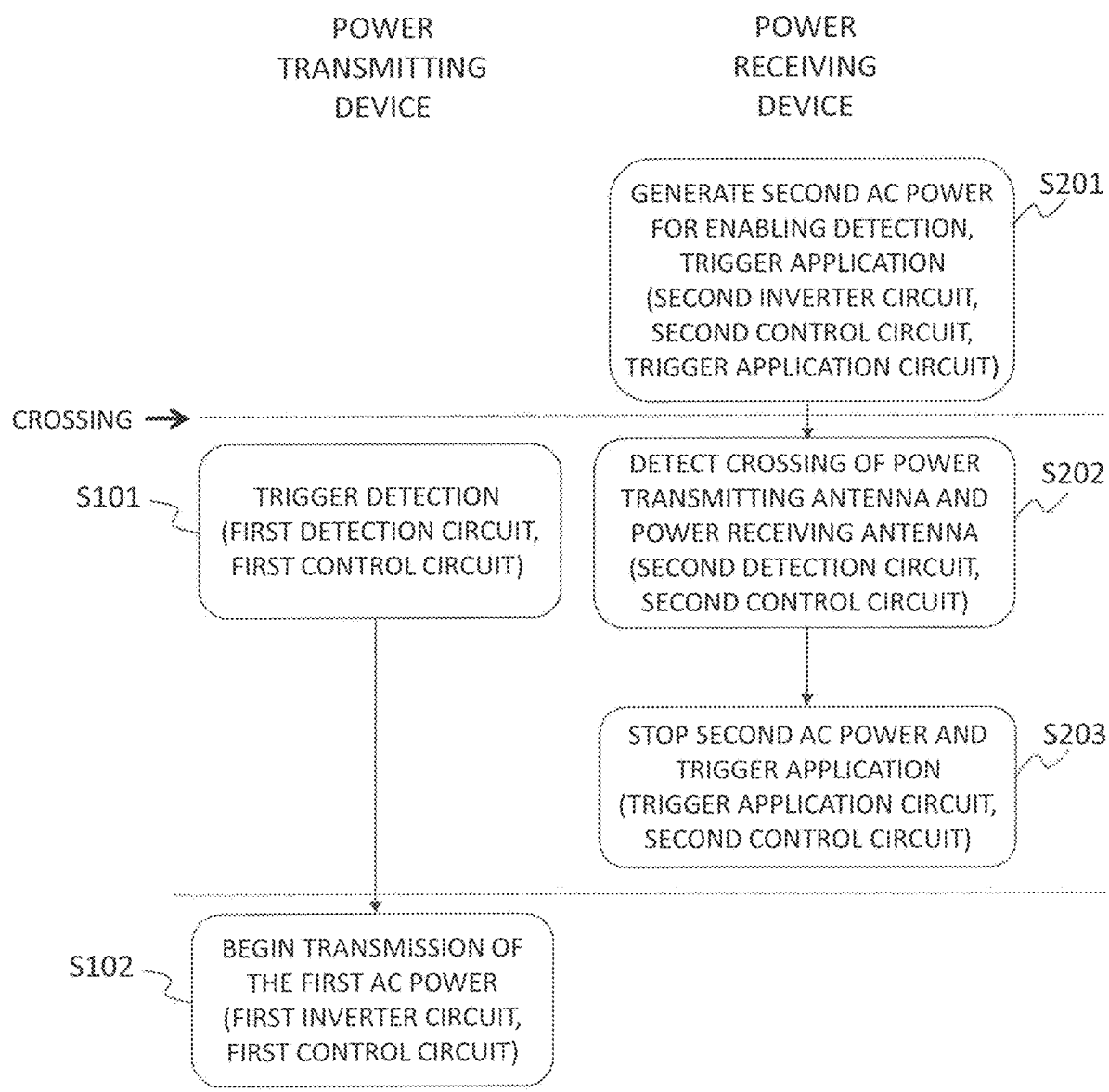
FIG. 11A is a diagram showing an example operation of a power transmitting device 100 and a power receiving device 200 shown in FIG. 6 or FIG. 10.

FIG. 11A is a diagram showing an example operation of the power transmitting device 100 and the power receiving device 200 shown in FIG. 6A or FIG. 10. In this example, first, before the power receiving antenna 220 begins to cross the power transmitting antenna 120, the power receiving device 200 generates second AC power for enabling detection, and applies a trigger signal (step S201). This operation is performed by the second inverter circuit 260, the second control circuit 250, and the trigger application circuit 290. Next, the power receiving device 200 detects crossing of the power transmitting antenna 120 and the power receiving antenna 220 (step S202). This operation is performed by the second detection circuit 270 and the second control circuit 250. Upon detecting crossing of the antennas, the power receiving device 200 stops transmission of the second AC power and trigger application (step S203). At this time, as described earlier, the second control circuit 250 isolates the second inverter circuit 260 and the trigger application circuit 290 from the transmission path of the first AC power. On the other hand, the power transmitting device 100 detects the trigger signal which has been sent from the power receiving device 200 (step S101). This operation is performed by the first detection circuit 170 and the first control circuit 150. Upon detecting the trigger signal, the power transmitting device 100 begins transmission of the first AC power (step S102).

Through such operation, before transmission of the large-powered first AC power is begun, the power receiving device 200 can stop transmission of the second AC power and trigger application. Moreover, before transmission of the first AC power is begun, the second inverter circuit 260 and the trigger application circuit 290 are isolated from the transmission path of the first AC power. As a result, without destroying the circuitry in the power receiving device 200, transmission of a large power can be begun.

Figure 11B:
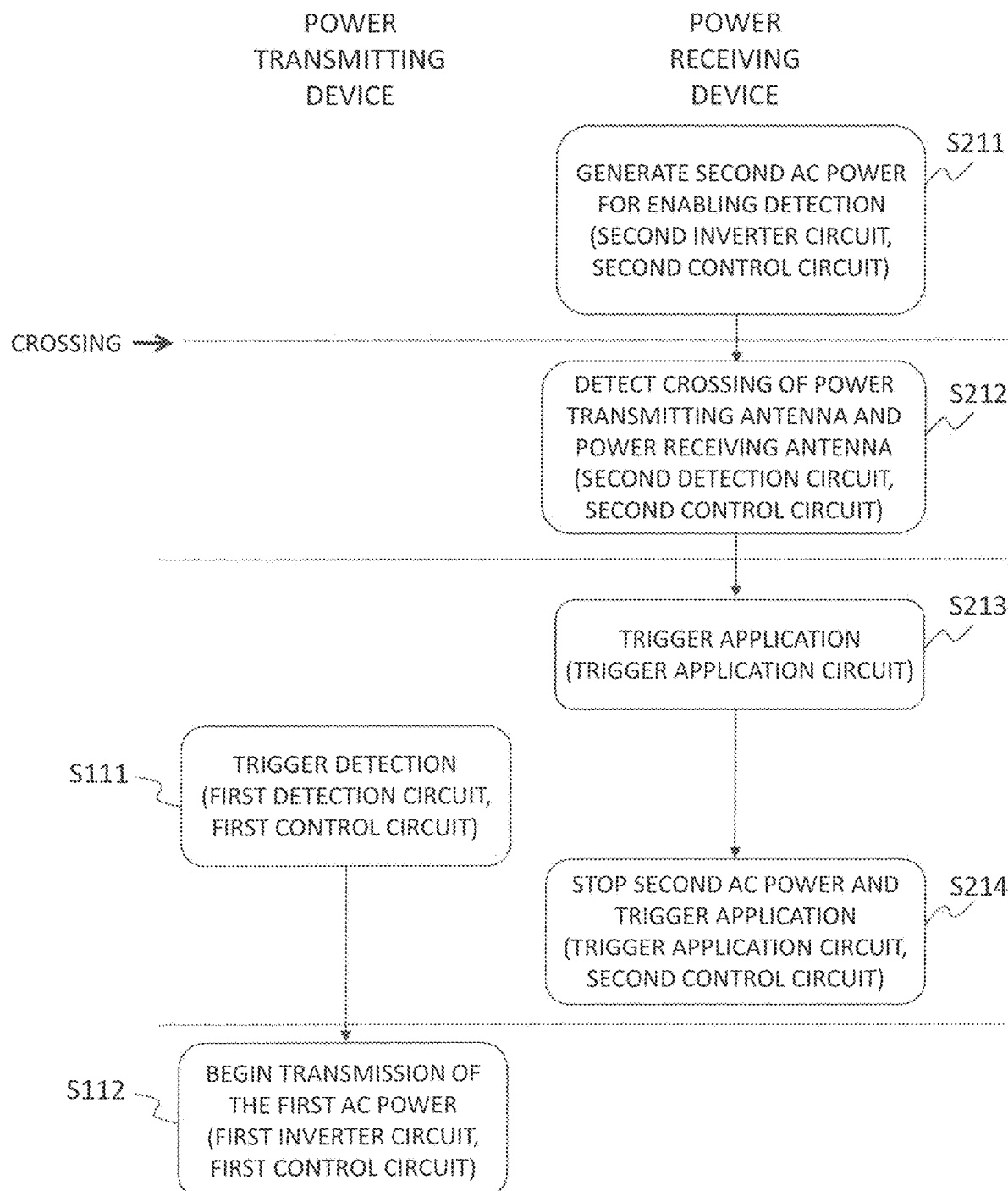
FIG. 11B is a diagram showing another example operation of a power transmitting device 100 and a power receiving device 200 shown in FIG. 6 or FIG. 10.

FIG. 11B is a diagram showing another example operation of the power transmitting device 100 and the power receiving device 200 shown in FIG. 6A or FIG. 10. In this example, first, before the power receiving antenna 220 begins to cross the power transmitting antenna 120, the power receiving device 200 generates second AC power for enabling detection (step S211). At this point, a trigger signal is not applied yet. Next, the power receiving device 200 detects that the power transmitting antenna 120 and the power receiving antenna 220 have begun to cross each other (step S212). Upon detecting crossing of the antennas, the power receiving device 200 applies a trigger signal to the second AC power (step S213). Thereafter, the power receiving device 200 stops outputting of the second AC power and application of the trigger signal (step S214). At this time, the second control circuit 250 isolates the second inverter circuit 260 and the trigger application circuit 290 from the transmission path of the first AC power. On the other hand, the power transmitting device 100 detects the trigger signal which has been sent from the power receiving device 200 (step S111). Upon detecting the trigger signal, the power transmitting device 100 begins transmission of the first AC power (step S112).

Through such operation, too, the power receiving device 200 can stop transmission of the second AC power and trigger application before transmission of the large-powered first AC power is begun. Moreover, before transmission of the first AC power is begun, the second inverter circuit 260 and the trigger application circuit 290 are isolated from the transmission path of the first AC power. As a result, without destroying the circuitry in the power receiving device 200, transmission of a large power can be begun.

Figure 12A:
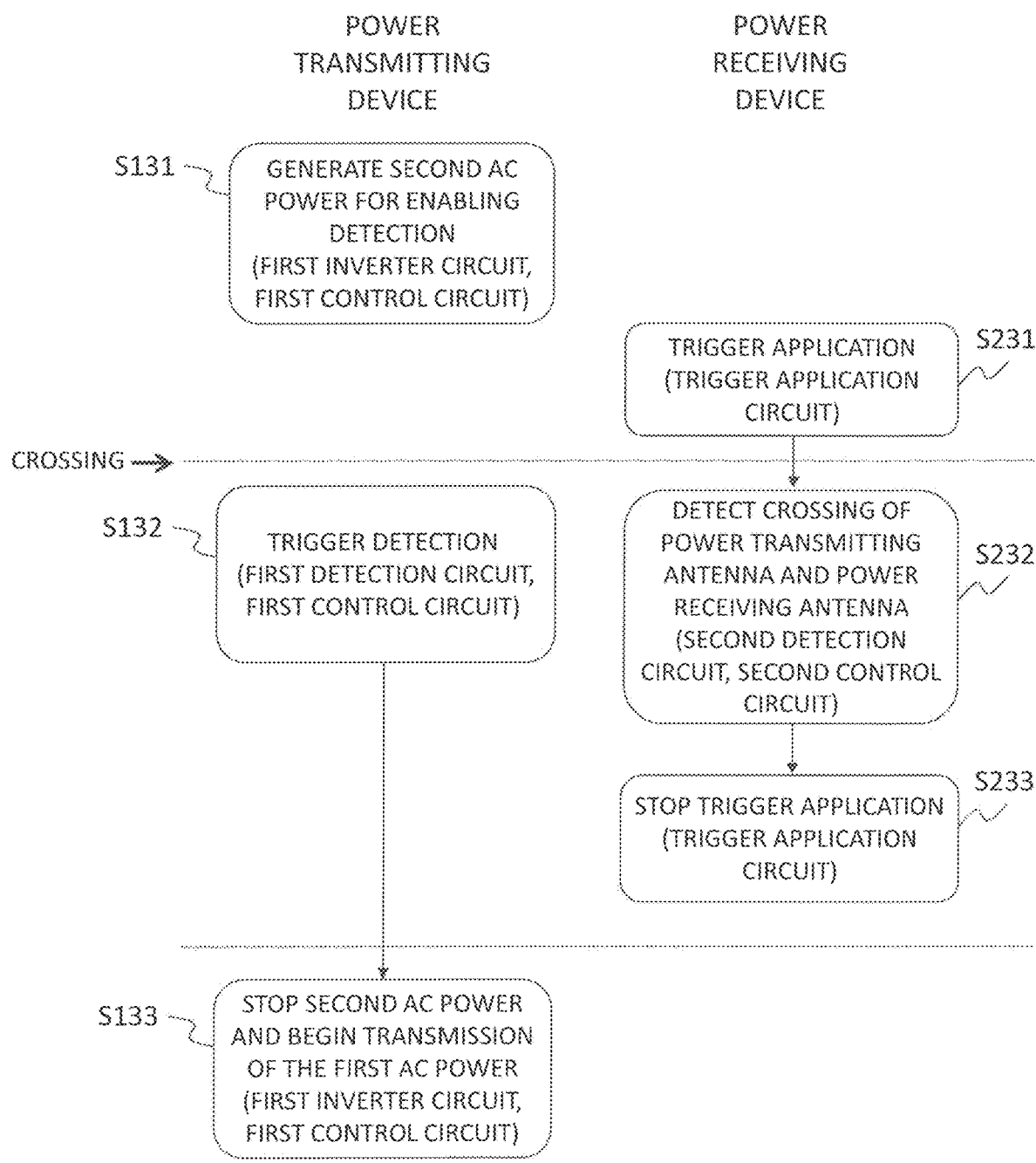
FIG. 12A is a diagram showing an example operation of a power transmitting device 100 and a power receiving device 200 shown in FIG. 7.

FIG. 12A is a diagram showing an example operation of the power transmitting device 100 and the power receiving device 200 shown in FIG. 7. In this example, first, the first inverter circuit 160 and the first control circuit 150 in the power transmitting device 100 generate second AC power for enabling detection (step S131). The trigger application circuit 290 in the power receiving device 200 applies a trigger signal to the second AC power (step S231). Generation of the second AC power and application of the trigger signal are begun before the power receiving antenna 220 begins to cross the power transmitting antenna 120. Next, based on the output of the second detection circuit 270, the second control circuit 250 in the power receiving device 200 detects crossing of the power transmitting antenna 120 and the power receiving antenna 220 (step S232). Thereafter, the trigger application circuit 290 in the power receiving device 200 stops application of a trigger signal (step S233). At this time, the second control circuit 250 isolates the trigger application circuit 290 from the transmission path of the first AC power. On the other hand, after step S231, the first control circuit 150 in the power transmitting device 100 detects the trigger signal superposed on the second AC power based on the output of the first detection circuit 170. Upon detecting the trigger signal, the first control circuit 150 causes the first inverter circuit 160 to stop the second AC power and begin transmission of the first AC power (step S133).

Through such operation, the power receiving device 200 can stop trigger application before transmission of the large-powered first AC power is begun. Moreover, before transmission of the first AC power is begun, the trigger application circuit 290 is isolated from the transmission path of the first AC power. As a result, without destroying the circuitry in the power receiving device 200, transmission of a large power can be begun.

Figure 12B:
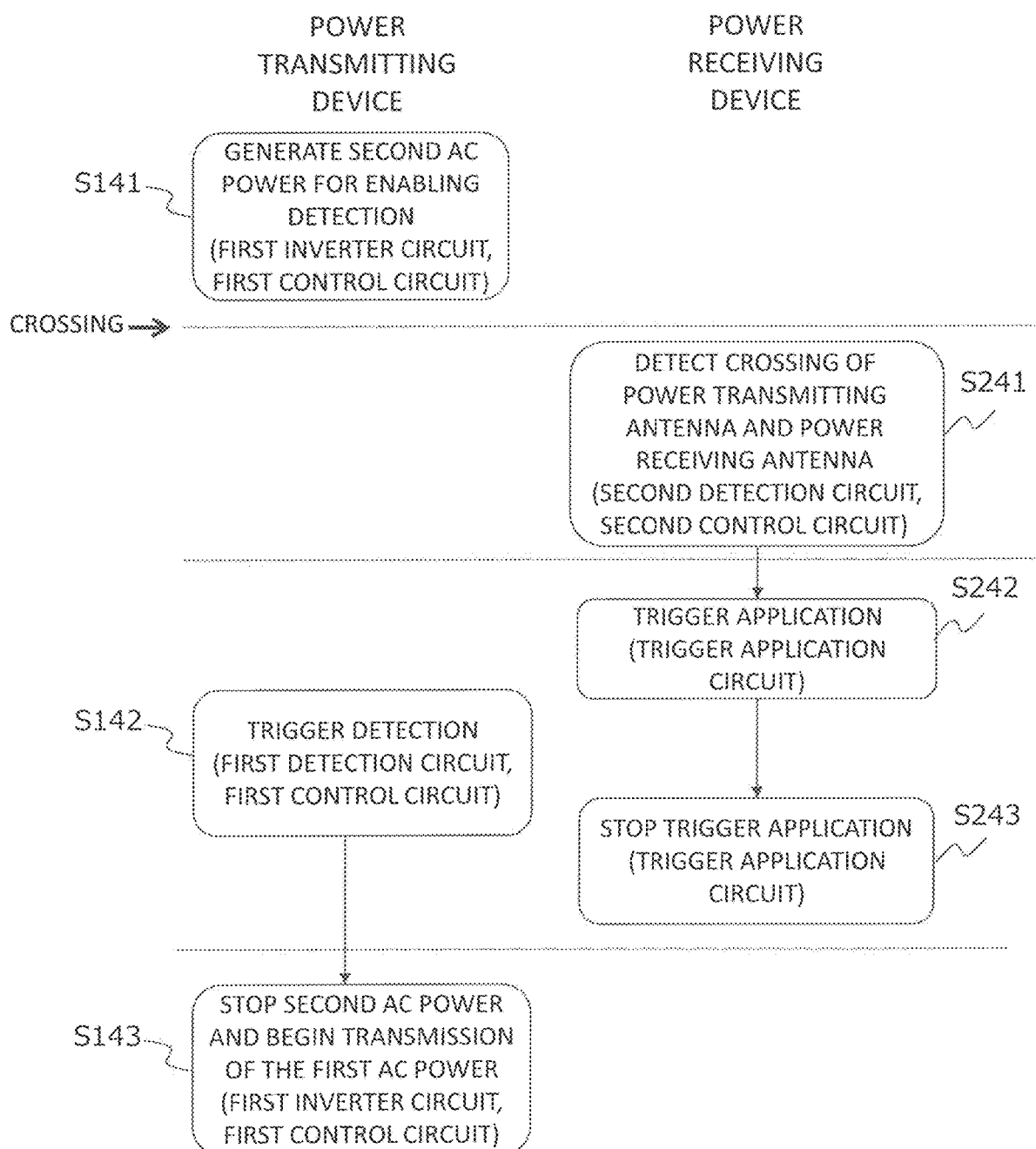
FIG. 12B is a diagram showing another example operation of a power transmitting device 100 and a power receiving device 200 shown in FIG. 7.

FIG. 12B is a diagram showing another example operation of the power transmitting device 100 and the power receiving device 200 shown in FIG. 7. In this example, first, before the power receiving antenna 220 crosses the power transmitting antenna 120, the power transmitting device 100 generates second AC power for enabling detection (step S141). When the power receiving antenna 220 begins to cross the power transmitting antenna 120, based on the output of the second detection circuit 270, the second control circuit 250 in the power receiving device 200 detects crossing of the power transmitting antenna 120 and the power receiving antenna 220 (step S241). Then, the trigger application circuit 290 applies a trigger signal to the second AC power (step S242). Thereafter, the trigger application circuit 290 stops application of the trigger signal (step S243). At this time, the second control circuit 250 isolates the trigger application circuit 290 from the transmission path of the first AC power. On the other hand, after step S242, the first control circuit 150 in the power transmitting device 100 detects the trigger signal superposed on the second AC power based on the output of the first detection circuit (step S142). Upon detecting the trigger signal, the first control circuit 150 causes the first inverter circuit 160 to stop the second AC power and begin transmission of the first AC power (step S143).

With such operation, too, the power receiving device 200 can stop trigger application before transmission of the large-powered first AC power is begun. Moreover, before transmission of the first AC power is begun, the trigger application circuit 290 is isolated from the transmission path of the first AC power. As a result, without destroying the circuitry in the power receiving device 200, transmission of a large power can be begun.

Thus, according to the present embodiment, before beginning transmission of large power, a trigger signal for notifying the presence of the power receiving device 200 is sent from the power receiving device 200 to the power transmitting device 100. Unlike any data sequence which is sent through a communication by the conventional load modulation method, this trigger signal may well be a signal of a single pulse or a few pulses, for example. Based on a fluctuation in the current and/or voltage in the power transmitting device 100, the power transmitting device 100 is able to detect the trigger signal in a short period of time.

The load 330 may include a charge storing device such as a secondary battery or a capacitor. In that case, the second control circuit 250 may stop the operation of the second inverter circuit 260 and/or the trigger application circuit 290 when the remaining energy amount in the charge storing device is greater than a predetermined value. Through such control, an unnecessary charge operation can be prevented from being begun when there is a sufficient remaining energy amount in the charge storing device.

Next, with reference to FIG. 13A and FIG. 13B, an Example and effects thereof will be described.

Figure 13A:
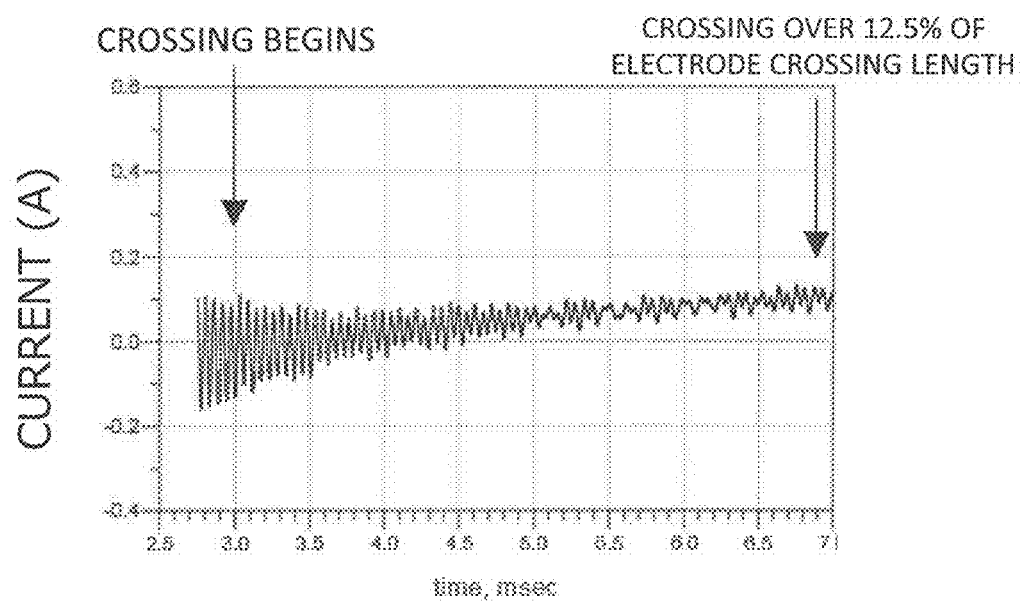
FIG. 13A is a diagram showing an exemplary change over time in the current in the power transmitting device 100 in the case where application of a trigger signal is not performed.

FIG. 13A is a diagram showing an exemplary change over time in the current in the power transmitting device 100 in the case where application of a trigger signal is not performed. FIG. 13B is a diagram showing an exemplary change over time in the current in the power transmitting device 100 in the case where a trigger signal according to the present embodiment is applied. The current waveforms shown in FIG. 13A and FIG. 13B are waveforms resulting after removing an unwanted high-frequency component therefrom. In this example, a configuration as illustrated in FIG. 7 and FIG. 9A is adopted. As the power transmitting antenna 120, a pair of power transmitting electrodes were used; as the power receiving antenna 220, a pair of power receiving electrodes were used. For each of the power transmitting electrodes and the power receiving electrodes, two electrodes which were 15 cm wide were used, with an interspace of 15 cm between the two electrodes. As the trigger application circuit 290, the configuration shown in FIG. 8A was adopted. As the impedance element, a shunt resistor of 12 mΩ was used. It was assumed that the transmission frequency of power was 500 kHz; there was an electrode crossing length of 40 cm; and the power receiving device 200 would move at a velocity of 12.5 m/second toward the power transmitting electrodes 120. Herein, the electrode crossing length means the largest of a length along which the power transmitting electrodes and the power receiving electrodes cross each other.

Figure 13B:
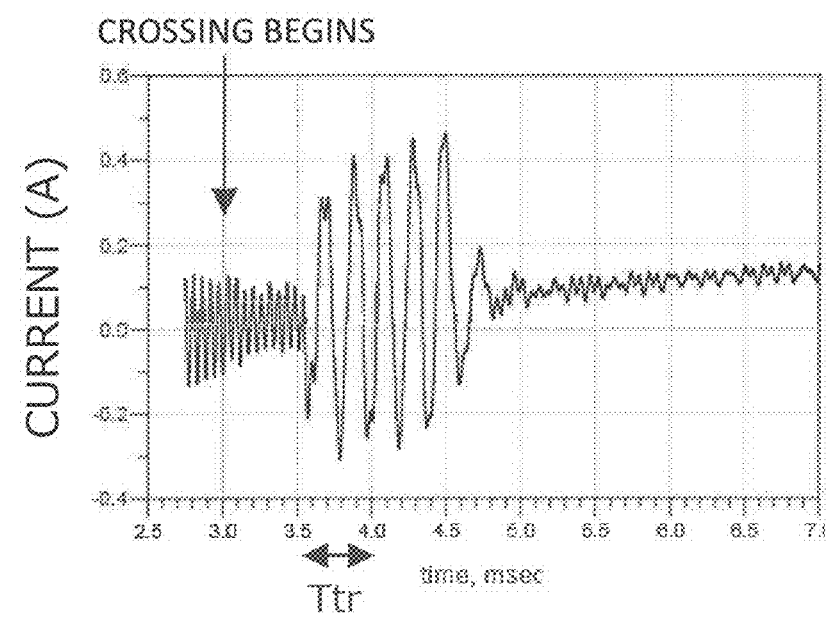
FIG. 13B is a diagram showing an exemplary change over time in the current in the power transmitting device 100 in the case where a trigger signal according to the present embodiment is applied.

At the time of 3.0 milliseconds shown in FIG. 13A and FIG. 13B, the power receiving electrodes 220 and the power transmitting electrodes 120 began to cross (became opposed), and at the time of 7.0 milliseconds, 5 cm of them crossed, which is equal to 12.5% of the electrode crossing length. As shown in FIG. 13B, as a trigger signal, five rectangular pulses with a frequency of 5 kHz were applied from the time of 3.5 milliseconds. Note that the ripple in the current before crossing of the electrodes shown in FIG. 13A and FIG. 13B occurred due to an inverter operation associated with application of an energy for enabling detection under an unloaded state. This ripple is unrelated to the principles of the technique according to the present disclosure, and does not affect the preferable effects of this Example.

As shown in FIG. 13B, with the application of a trigger signal, the current in the power transmitting device 100 greatly fluctuates. It will be appreciated that arrival of the power receiving device 200 can be detected in a short time of a ¼ period to several periods after the current fluctuation due to the trigger signal begins. Assuming that arrival of the movable unit was determined in an amount of time equal to the period Ttr of the trigger signal, in this Example, this would mean that the detection was established at a point where the power receiving electrodes 220 had entered the charging area by 2.2% of the length of the power transmitting electrodes since the beginning of crossing of the power transmitting electrodes 120 and the power receiving electrodes 220.

In contemplating the possibility of applying the configuration of this Example also to an elevator, the inventors also conducted a similar study for the case where the moving velocity is 20 m/second, the electrode crossing length is 75 cm, and the length of the charging area (i.e., power transmitting electrode length) is 3 m. It was confirmed that detection is possible when the power receiving electrodes have entered the charging area by 2.64 cm. This corresponds to only 0.88% of the power transmitting electrode length.

Thus, by adopting the configuration according to the present embodiment, it is possible to detect the arrival of the power receiving device 200 in a very short time. Even in the case of a rapidly moving movable unit, this allows almost the entire length of time in which the power receiving electrodes move while being opposed to the installed power transmitting electrodes to be effectively dedicated to the charging time.

Figure 14:
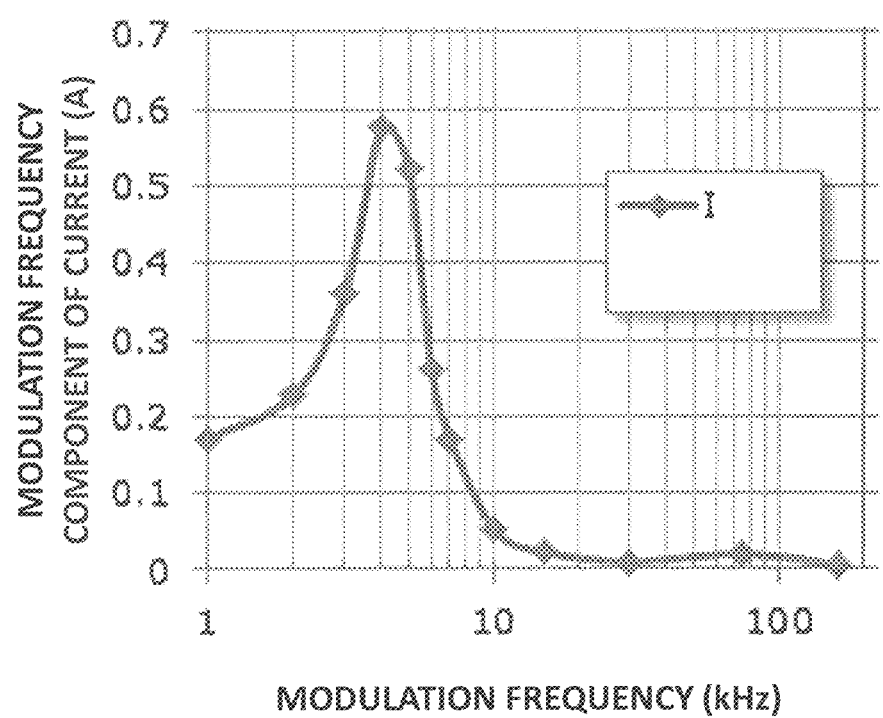
FIG. 14 is a diagram showing exemplary dependence of detection intensity with respect to frequency of the trigger signal.

FIG. 14 is a diagram showing exemplary dependence of detection intensity with respect to frequency of the trigger signal. In this example, too, a similar configuration to the above Example was adopted. The frequency (referred to as the transmission frequency) of the second AC power, i.e., energy for enabling detection, was 500 kHz, and the current component at the modulation frequency was measured while changing the frequency (referred to as the modulation frequency) of the trigger signal. The current component was measured under a condition where 13.3% of the power receiving electrode length crossed the power transmitting electrodes. From the result shown in FIG. 14, it can be seen that the detection intensity increases when the modulation frequency is not less than ¹⁄₅₀₀ times the transmission frequency and not more than ¹⁄₅₀ times the transmission frequency. In particular, when the modulation frequency is not less than ¹⁄₂₀₀ times the transmission frequency and not more than ¹⁄₈₀ times the transmission frequency, a good S/N can be expected.

Next, an example configuration in connection with power transmission in a wireless power transmission system according to the present embodiment will be described. Again, an example where the power receiving device 200 is mounted on a movable unit, and where each of the power transmitting antenna and the power receiving antenna is composed of a pair of electrodes, will be described. The configuration described below is an example; depending on the required function and performance, it may be altered as appropriate.

Figure 15:
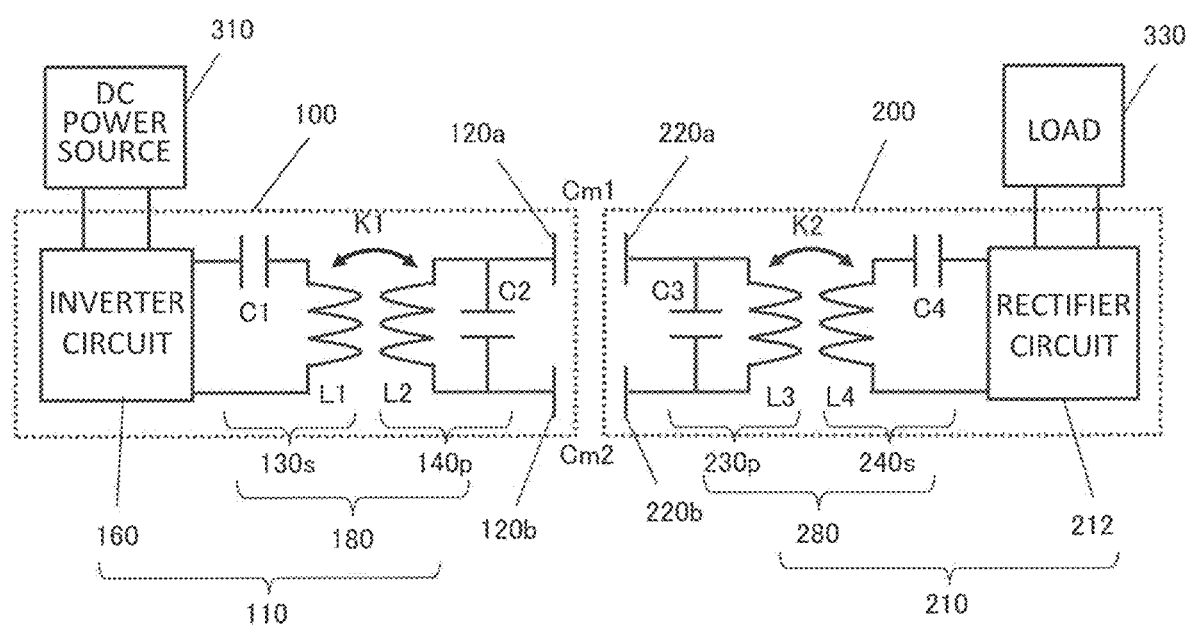
FIG. 15 is a diagram showing another example configuration of the wireless power transmission system.

FIG. 15 is a diagram showing another example configuration of the wireless power transmission system. In the wireless power transmission system according to the present embodiment, as illustrated in FIG. 1, power is wirelessly transmitted from a pair of power transmitting electrodes 120a and 120b, which are installed on the road surface, to a pair of power receiving electrodes 220a and 220b, which are mounted in a movable unit 10. In FIG. 15, the first control circuit 150, the first detection circuit 170, the second detection circuit 270, the trigger application circuit 290, the second inverter circuit 260, and the second control circuit 250 (which are shown in FIGS. 6A, 7, and 10) are omitted from illustration.

Although not particularly limited, the respective sizes of the housing of the movable unit 10, the power transmitting electrodes 120a and 120b, and the power receiving electrodes 220a and 220b may be set to the following sizes, for example. The length (i.e., size along the Y direction) of the power transmitting electrodes 120a and 120b may be set in a range from 50 cm to 20 m, for example. The width of each of the power transmitting electrodes 120a and 120b (i.e., size along the X direction) may be set in a range from 0.5 cm to 1 m, for example. The size of the housing of the movable unit 10 along each of its traveling direction and transverse direction may be set in a range from 20 cm to 5 m, for example. The length (i.e., size along the traveling direction) of each of the power receiving electrodes 220a and 220b may be set in a range from 5 cm to 2 m, for example. The width (i.e., size along the transverse direction) of each power receiving electrodes 220a and 220b may be set in a range from 2 cm to 2 m, for example. The gap between the pair of power transmitting electrodes and the gap between the pair of power receiving electrodes may be set in a range from 1 mm to 40 cm, for example. However, such numerical ranges are not limiting.

A load 330 may include an electric motor for driving purposes, and a capacitor or secondary battery for charge-storing purposes, for example. The load 330 may be driven or charged by DC power which is output from a rectifier circuit 212.

The electric motor may be any motor, such as a DC motor, a permanent magnet synchronous motor, an induction motor, a stepping motor, or a reluctance motor. The motor rotates wheels of the movable unit 10 via shafts, gears, etc., thus causing the movable unit 10 to move. Depending on the type of motor, the power receiving circuit 210 may include various circuits such as a rectifier circuit, an inverter circuit, or an inverter control circuit. In order to drive an AC motor, the power receiving circuit 210 may include a converter circuit which directly converts the frequency of received energy (i.e., AC power) into a frequency for driving the motor.

The capacitor may be a high-capacitance and low-resistance capacitor, such as an electric double layer capacitor or a lithium ion capacitor, for example. By using such a capacitor as the charge storing device, a more rapid charging becomes possible than in the case of using a secondary battery. Instead of a capacitor, a secondary battery (e.g., a lithium-ion battery) may be used. In that case, the time required for charging may increase, but a greater amount of energy can be stored. The movable unit 10 moves by driving the motor with the power which is stored in the capacitor or secondary battery.

When the movable unit 10 moves, the amount of stored electricity (i.e., charge amount) of the capacitor or secondary battery decreases. This makes recharging necessary in order to continue movement. Therefore, if the charge amount becomes lower than a predetermined threshold value during movement, the movable unit 10 moves to near the power transmitting device 100, and performs charging. This movement may be performed under the control of a central control unit not shown, or may be performed by autonomous judgment of the movable unit 10. The power transmitting device 100 may be installed at a plurality of points within a factory.

In the example shown in the figure, the matching circuit 180 in the power transmitting device 100 includes: a series resonant circuit 130s that is connected to an inverter circuit 160; and a parallel resonant circuit 140p that is connected to the power transmitting electrodes 120a and 120b and inductively couples to the series resonant circuit 130s. The matching circuit 180 achieves matching between the impedance of the inverter circuit 160 and the impedance of the power transmitting electrodes 120a and 120b. The series resonant circuit 130s in the power transmitting device 100 is configured so that a first coil L1 and a first capacitor C1 are connected in series. The parallel resonant circuit 140p in the power transmitting device 100 is configured so that a second coil L2 and a second capacitor C2 are connected in parallel. The first coil L1 and the second coil L2 constitute a transformer that couples with a predetermined coupling coefficient. The turns ratio between the first coil L1 and the second coil L2 may be set to a value for realizing a desired transformation ratio (a step-up ratio or a step-down ratio).

A matching circuit 280 in the power receiving device 200 includes: a parallel resonant circuit 230p that is connected to the power receiving electrodes 220a and 220b; and a series resonant circuit 240s that is connected to the rectifier circuit 212 and inductively couples to the parallel resonant circuit 230p. The matching circuit 280 achieves matching between the impedance of the power receiving electrodes 220a and 220b and the impedance of the rectifier circuit 212. The parallel resonant circuit 230p is configured so that a third coil L3 and a third capacitor C3 are connected in parallel. The series resonant circuit 240s in the power receiving device 200 is configured so that a fourth coil L4 and a fourth capacitor C4 are connected in series. The third coil and the fourth coil constitute a transformer that couples with a predetermined coupling coefficient. The turns ratio between the third coil L3 and the fourth coil L4 may be set to a value for realizing a desired transformation ratio.

Note that the configurations of the matching circuit 180 and 280 are not limited to the configurations shown in FIG. 15. For example, instead of each of the series resonant circuits 130s and 240s, a parallel resonant circuit may be provided. Instead of each of the parallel resonant circuits 140p and 230p, a series resonant circuit may be provided. Furthermore, one or both of the matching circuits 180 and 280 may be omitted. In the case where the matching circuit 180 is omitted, the inverter circuit 160 and the power transmitting electrodes 120a and 120b are directly connected. In the case where the matching circuit 280 is omitted, the rectifier circuit 212 and the power receiving electrodes 220a and 220b are directly connected. In the present specification, a configuration in which the matching circuit 180 is provided also qualifies as a configuration in which the inverter circuit 160 and the power transmitting electrodes 120a and 120b are electrically connected. Similarly, a configuration in which the matching circuit 280 is provided also qualifies as a configuration in which the rectifier circuit 212 and the power receiving electrodes 220a and 220b are electrically connected.

Figure 16:
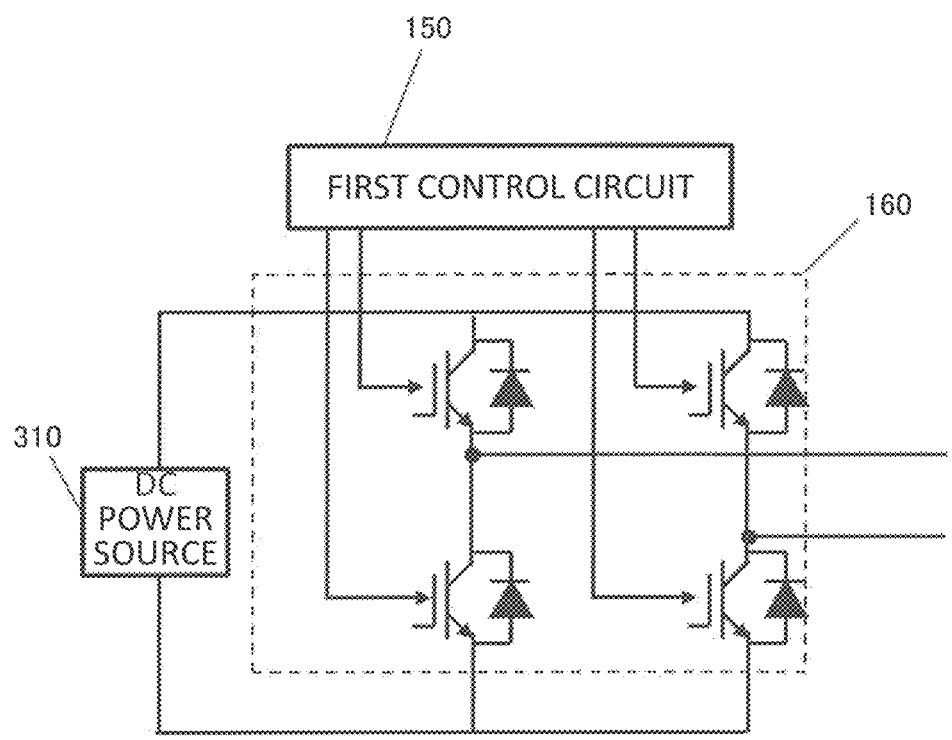
FIG. 16 is a diagram schematically showing an example configuration of an inverter circuit 160.

FIG. 16 is a diagram schematically showing an example configuration of the inverter circuit 160. In this example, the inverter circuit 160 is a full-bridge type inverter circuit which includes four switching elements. Each switching element may be composed of a transistor such as an IGBT or a MOSFET, for example. The first control circuit 150 includes a gate driver which outputs a control signal for controlling the conduction (ON) and non-conduction (OFF) states of each switching element and a processor which causes the gate driver to output the control signal. The processor may be a CPU of a microcontroller unit (MCU), for example. Instead of the full-bridge type inverter circuit shown in FIG. 16, a half-bridge type inverter circuit, or any other oscillation circuit, e.g., class E, may be used.

The inverter circuit 160 may include modulation/demodulation circuits for communications purposes, and various sensors for measuring the voltage, current, etc. In the case where modulation/demodulation circuits for communications purposes are included, data may be superposed on AC power and sent to the power receiving device 200. Note that the second inverter circuit 260 shown in FIG. 6A can also be implemented in a configuration similar to that of the first inverter circuit 160.

Figure 17:
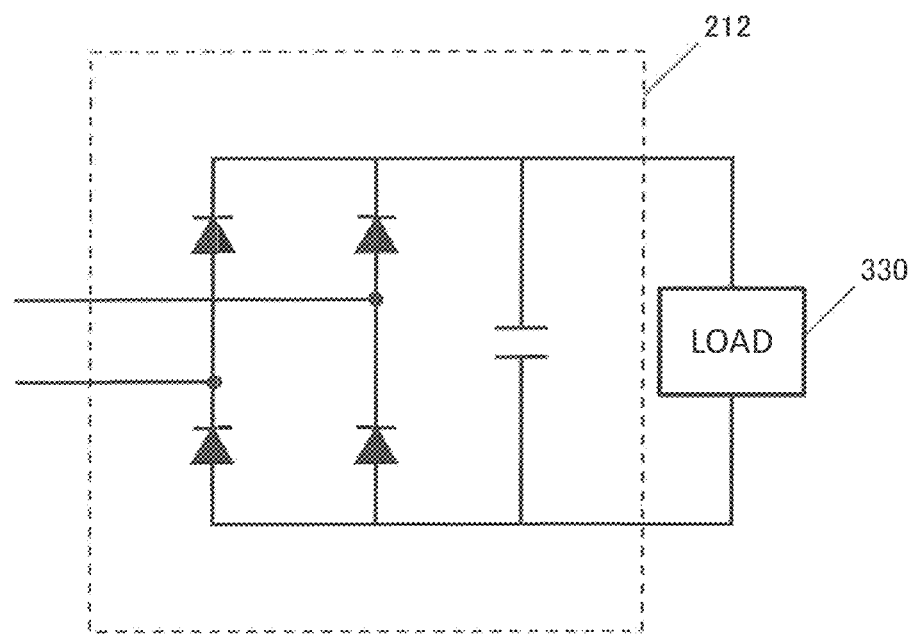
FIG. 17 is a diagram schematically showing an example configuration of a rectifier circuit 212.

FIG. 17 is a diagram schematically showing an example configuration of the rectifier circuit 212. In this example, the rectifier circuit 212 is a full-wave rectifier circuit which includes a diode bridge and a smoothing capacitor. The rectifier circuit 212 may have any other rectifier configuration. In addition to the rectifier circuit 212, the power receiving circuit 210 may include various circuits such as constant voltage/constant current control circuits, modulation/demodulation circuits for communications purposes, and the like. The power receiving circuit 210 converts the received AC energy into a DC energy which is available for use by the load 330. Various sensors for measuring the voltage, current, etc., which is output from the series resonant circuit 240s may be included in the power receiving circuit 210.

Each coil in the resonant circuits 130s, 140p, 230p and 240s may be a planar coil or a laminated coil formed on a circuit board, or a wound coil in which a copper wire, a litz wire, a twisted wire or the like is used, for example. For each capacitor in the resonant circuits 130s, 140p, 230p and 240s, any type of capacitor having a chip shape or a lead shape can be used, for example. A capacitance between two wiring lines with air interposed between them may be allowed to function as each capacitor. The self-resonance characteristics that each coil possesses may be utilized in the place of any such capacitor.

The DC power source 310 may be any power source, such as mains supply, a primary battery, a secondary battery, a photovoltaic cell, a fuel cell, a USB (Universal Serial Bus) power source, a high-capacitance capacitor (e.g., an electric double layer capacitor), a voltage converter connected to the mains supply, for example.

The resonant frequency f0 of the resonant circuits 130s, 140p, 230p and 240s is typically set to be equal to the transmission frequency f during power transmission. It is not necessary for the resonant frequency f0 of each of the resonant circuits 130s, 140p, 230p and 240s to be exactly equal to the transmission frequency f. The resonant frequency f0 of each may be set to a value in the range of about 50 to about 150% of the transmission frequency f, for example. The frequency of the power transmission may be e.g. 50 Hz to 300 GHz; 20 kHz to 10 GHz in one example; 20 kHz to 20 MHz in another example; and 80 kHz to 14 MHz in still another example.

In the present embodiment, what exists between the power transmitting electrodes 120a and 120b and the power receiving electrodes 220a and 220b is an air gap, with a relatively long distance therebetween (e.g., about 5 mm to about 30 mm). Therefore, the capacitances Cm1 and Cm2 between the electrodes are very small, and impedances of the power transmitting electrodes 120a and 120b and the power receiving electrodes 220a and 220b are very high (e.g., on the order of several kΩ)). On the other hand, the impedances of the inverter circuit 160 and the rectifier circuit 212 are as low as about several Ω. In the present embodiment, the parallel resonant circuits 140p and 230p are disposed so as to be closer to, respectively, the power transmitting electrodes 120a and 120b and the power receiving electrodes 220a and 220b; and the series resonant circuits 130s and 240s are disposed closer to, respectively, the inverter circuit 160 and the rectifier circuit 212. Such configuration facilitates impedance matching. A series resonant circuit has zero (0) impedance during resonance, and therefore is suitable for matching with a low impedance. On the other hand, a parallel resonant circuit has an infinitely large impedance during resonance, and therefore is suitable for matching with a high impedance. Thus, as in the configuration shown in FIG. 15, disposing a series resonant circuit on the power source with low impedance and disposing a parallel resonant circuit on the electrode side with high impedance facilitates impedance matching. Similarly, disposing a parallel resonant circuit on the electrode side and disposing a series resonant circuit on the load side facilitates impedance matching in the power receiving device 200.

Note that such an asymmetric resonant circuit configuration is not an essential requirement. For example, in configurations where the distance between the power transmitting electrodes 120a and 120b and the power receiving electrodes 220a and 220b is shortened, or a dielectric is disposed therebetween, the electrode impedance will be so low that an asymmetric resonant circuit configuration is not needed. Moreover, when no impedance matching issue exists, the matching circuits 180 and 280 may themselves be omitted.

Although the electrodes in the above embodiments are structured so as to extend in parallel in the same direction, such a structure may not be needed depending on the purpose. For example, each electrode may have a rectangular shape, e.g., a square. The technique according to the present disclosure is applicable to any implementation in which a plurality of electrodes such as rectangular shapes are arranged along one direction. Moreover, it is not essentially required that the surfaces of all electrodes be on the same plane. Furthermore, the surface of each electrode does not need to have a perfectly planar shape, but may have a curved shape or a shape including rises and falls, for example. Any such surface also qualifies as a "planar surface" so long as it is schematically planar. Moreover, each electrode may be inclined with respect to the road surface.

As described above, a wireless power transmission system according to an embodiment of the present disclosure may be utilized as a system for transferring articles within a factory. The movable unit 10 functions as a wagon that includes a bed on which to carry articles and autonomously moves within the factory to transfer articles to places as needed. However, without being limited to such purposes, a wireless power transmission system and a movable unit according to the present disclosure may be utilized for various other purposes. For example, without being limited to an AGV, the movable unit may be any other industrial machine, a service robot, an electric vehicle, a forklift, a multicopter (drone), an elevator, or the like. Without being limited to factories, the wireless power transmission system may be used in stores, hospitals, homes, roads, runways, or any other places, for example.

Thus, the present disclosure encompasses wireless power transmission systems, power transmitting devices, and power receiving devices as recited in the following Items.

[Item 1]

A wireless power transmission system, comprising:

a power transmitting device; and a power receiving device, the power transmitting device including:

a first conversion circuit to convert power supplied from a first power source into charging power to be directed to charging in the power receiving device;

a power transmitting antenna to send out the charging power which is output from the first conversion circuit;

a first control circuit to control the first conversion circuit; and a first detection circuit to detect a fluctuation in current and/or voltage at a point on a transmission line from the power source to the power transmitting antenna, the power receiving device including:

a power receiving antenna to receive the charging power which is sent out from the power transmitting antenna;

a power receiving circuit to convert the charging power received by the power receiving antenna into an AC power of a frequency different from that of the charging power or DC power, and to supply the AC power or the DC power to a load; and a trigger application circuit to apply a trigger signal for informing the power transmitting device of presence of the power receiving device onto detecting power which is supplied from the power transmitting antenna side or the power receiving circuit side to the power receiving antenna, wherein, while the detecting power having the trigger signal applied thereto is supplied to the power receiving antenna, upon detecting the trigger signal based on a result of detection by the first detection circuit, the first control circuit causes the first conversion circuit to begin outputting the charging power.

[Item 2]

The wireless power transmission system of Item 1, wherein a voltage of the detecting power is smaller than a voltage of the charging power.

[Item 3]

The wireless power transmission system of Item 1 or 2, wherein, the power receiving device further includes a second conversion circuit to convert power supplied from a second power source into the detecting power and supply the detecting power to the power receiving antenna, and a second control circuit to control the second conversion circuit; and the second control circuit causes the second conversion circuit to output the detecting power in a state where the first conversion circuit is not outputting the charging power; and the trigger application circuit applies the trigger signal to the detecting power which is output from the second conversion circuit.

[Item 4]

The wireless power transmission system of Item 3, wherein, the second conversion circuit includes a plurality of switching elements;

the second control circuit causes the detecting power to be output from the second conversion circuit by supplying a control signal to each of the plurality of switching elements; and the trigger application circuit applies the trigger signal to the detecting power by superposing a signal of a lower frequency than a frequency of the control signal onto the control signal supplied from the second control circuit to the second conversion circuit.

[Item 5]

The wireless power transmission system of Item 3 or 4, wherein, the power receiving device further includes a second detection circuit to detect a fluctuation in current and/or voltage at a point on a transmission line from the power receiving antenna to the load, or between the second conversion circuit and the second power source; and, the second control circuit causes the second conversion circuit to output the detecting power, and thereafter, before the power receiving antenna becomes opposed to the power transmitting antenna, or upon determining that the power receiving antenna has moved to a position opposed to the power transmitting antenna based on a result of detection by the second detection circuit, causes the trigger application circuit to apply the trigger signal, and, after beginning outputting of the detecting power and application of the trigger signal, and before the charging power is output from the first conversion circuit in a state where the power receiving antenna is opposed to the power transmitting antenna, causes the second conversion circuit to stop outputting the detecting power and causes the trigger application circuit to stop application of the trigger signal.

[Item 6]

The wireless power transmission system of any of Items 3 to 5, wherein, the load includes a charge storing device; and, when a remaining energy amount in the charge storing device is greater than a predetermined value, the second control circuit stops operation of the second conversion circuit and the trigger application circuit.

[Item 7]

The wireless power transmission system of Item 1 or 2, wherein, the detecting power is supplied from the first conversion circuit to the power receiving antenna via the power transmitting antenna; and in a state of causing the first conversion circuit to output the detecting power, upon detecting the trigger signal based on a result of detection by the first detection circuit, the first control circuit causes the first conversion circuit to stop outputting the detecting power and begin outputting the charging power.

[Item 8]

The wireless power transmission system of Item 7, wherein, the power receiving device further includes a second detection circuit to detect a fluctuation in current and/or voltage at a point on a transmission line from the power receiving antenna to the load; and, the second control circuit, before the power receiving antenna becomes opposed to the power transmitting antenna, or upon determining that the power receiving antenna has moved to a position opposed to the power transmitting antenna based on a result of detection by the second detection circuit, causes the trigger application circuit to apply the trigger signal, and, after causing the trigger signal to be applied, and before the charging power is output from the first conversion circuit in a state where the power receiving antenna is opposed to the power transmitting antenna, causes the trigger application circuit to stop application of the trigger signal.

[Item 9]

The wireless power transmission system of Item 7 or 8, wherein, the load includes a charge storing device; and, if a remaining energy amount in the charge storing device is greater than a predetermined value, the second control circuit stops operation of the trigger application circuit.

[Item 10]

The wireless power transmission system of any of Items 1 to 9, wherein, the trigger application circuit includes an impedance element and a switch which are placed under a shunting condition at a point on a transmission line between the power receiving antenna and the load, and by controlling ON and OFF states of the switch, generates the trigger signal.

[Item 11]

The wireless power transmission system of any of Items 1 to 10, wherein, the power transmitting antenna includes a pair of power transmitting electrodes having a shape that is elongated in one direction; and the power receiving antenna includes a pair of power receiving electrodes which become opposed to the pair of power transmitting electrodes when receiving the charging power.

[Item 12]

The wireless power transmission system of any of Items 1 to 11, wherein the detecting power has a smaller voltage than a voltage of the charging power, and a frequency substantially equal to the frequency of the charging power.

[Item 13]

The wireless power transmission system of any of Items 1 to 12, wherein the trigger signal contains at least one pulse having a duration longer than a period of the detecting power.

[Item 14]

The wireless power transmission system of any of Items 1 to 13, wherein, after the current and/or voltage detected by the first detection circuit begins to fluctuate in response to application of the trigger signal, the first control circuit determines, before a time equivalent to one period of the fluctuation elapses, that the trigger signal has been applied, and causes the first conversion circuit to begin outputting the charging power.

[Item 15]

The wireless power transmission system of any of Items 1 to 14, wherein, the trigger signal is a signal containing a frequency component of the charging power; and when a waveform of a fluctuation in the current and/or voltage detected by the first detection circuit contains a frequency component of the charging power, the first control circuit determines that the trigger signal has been applied, and causes the first conversion circuit to begin outputting the charging power.

[Item 16]

The wireless power transmission system of Item 15, wherein the first detection circuit includes a filter circuit which selectively passes a signal of the frequency of the charging power, the filter circuit being disposed at a point on the transmission line from the first power source to the power transmitting antenna.

[Item 17]

The wireless power transmission system of any of Items 1 to 16, wherein the trigger signal contains a plurality of frequency components.

[Item 18]

The power transmitting device in the wireless power transmission system of any of Items 1 to 17.

[Item 19]

The power receiving device in the wireless power transmission system of any of Items 1 to 17.

INDUSTRIAL APPLICABILITY

The technique according to the present disclosure can be utilized in any device that is driven by power. For example, it may be utilized in any movable unit such as an electric vehicle (EV), an automated guided vehicle (AGV) used in a factory, a forklift, an unmanned aerial vehicle (UAV), an elevator, or the like.

REFERENCE SIGNS LIST 10 movable unit
30 road surface
100 power transmitting device
110 power transmitting circuit
120 power transmitting electrode (power transmitting antenna)
130s series resonant circuit
140p parallel resonant circuit
150 first control circuit
160 first inverter circuit
162 smoothing circuit
164 switch
170 first detection circuit
172 high-pass filter
174 terminator
176 low-pass filter
180 first matching circuit
190 communication circuit
200 power receiving device
210 power receiving circuit
212 rectifier circuit
220 power receiving electrode (power receiving antenna)
230p parallel resonant circuit
240s series resonant circuit
250 second control circuit
260 second inverter circuit
270 second detection circuit
280 second matching circuit
290 trigger application circuit
310, 320 DC power source
330 load
400 foreign metal object

The invention claimed is:

1. A wireless power transmission system, comprising:
a power transmitting device; and
a power receiving device,
the power transmitting device including:
a first conversion circuit to convert power supplied from a first power source into charging power to be directed to charging in the power receiving device;
a power transmitting antenna to send out the charging power which is output from the first conversion circuit;
a first control circuit to control the first conversion circuit; and
a first detection circuit to detect a fluctuation in current and/or voltage at a point on a transmission line from the first power source to the power transmitting antenna,
the power receiving device including:
a power receiving antenna to receive the charging power which is sent out from the power transmitting antenna;
a power receiving circuit to convert the charging power received by the power receiving antenna into an AC power of a frequency different from that of the charging power or DC power, and to supply the AC power or the DC power to a load;
a second conversion circuit to convert power supplied from a second power source into detecting power and supply the detecting power to the power receiving antenna;
a second control circuit to control the second conversion circuit, the second control circuit being configured to cause the second conversion circuit to output the detecting power in a state where the first conversion circuit is not outputting the charging power; and
a trigger application circuit to apply a trigger signal for informing the power transmitting device of presence of the power receiving device onto the detecting power which is supplied from the second conversion circuit to the power receiving antenna, wherein,
while the detecting power having the trigger signal applied thereto is supplied to the power receiving antenna, upon detecting the trigger signal based on a result of detection by the first detection circuit, the first control circuit causes the first conversion circuit to begin outputting the charging power.

2. The wireless power transmission system of claim 1, wherein a voltage of the detecting power is smaller than a voltage of the charging power.

3. The wireless power transmission system of claim 1, wherein,
the second conversion circuit includes a plurality of switching elements;
the second control circuit causes the detecting power to be output from the second conversion circuit by supplying a control signal to each of the plurality of switching elements; and
the trigger application circuit applies the trigger signal to the detecting power by superposing a signal of a lower frequency than a frequency of the control signal onto the control signal supplied from the second control circuit to the second conversion circuit.

4. The wireless power transmission system of claim 1, wherein, the power receiving device further includes a second detection circuit to detect a fluctuation in current and/or voltage at a point on a transmission line from the power receiving antenna to the load, or between the second conversion circuit and the second power source; and, the second control circuit causes the second conversion circuit to output the detecting power, and thereafter, before the power receiving antenna becomes opposed to the power transmitting antenna, or upon determining that the power receiving antenna has moved to a position opposed to the power transmitting antenna based on a result of detection by the second detection circuit, causes the trigger application circuit to apply the trigger signal, and, after beginning outputting of the detecting power and application of the trigger signal, and before the charging power is output from the first conversion circuit in a state where the power receiving antenna is opposed to the power transmitting antenna, causes the second conversion circuit to stop outputting the detecting power and causes the trigger application circuit to stop application of the trigger signal.

5. The wireless power transmission system of claim 1, wherein, the load includes a charge storing device; and, when a remaining energy amount in the charge storing device is greater than a predetermined value, the second control circuit stops operation of the second conversion circuit and the trigger application circuit.

6. The wireless power transmission system of claim 1, wherein, the detecting power is supplied from the first conversion circuit to the power receiving antenna via the power transmitting antenna; and in a state of causing the first conversion circuit to output the detecting power, upon detecting the trigger signal based on a result of detection by the first detection circuit, the first control circuit causes the first conversion circuit to stop outputting the detecting power and begin outputting the charging power.

7. The wireless power transmission system of claim 6, wherein, the power receiving device further includes a second detection circuit to detect a fluctuation in current and/or voltage at a point on a transmission line from the power receiving antenna to the load; and, the second control circuit, before the power receiving antenna becomes opposed to the power transmitting antenna, or upon determining that the power receiving antenna has moved to a position opposed to the power transmitting antenna based on a result of detection by the second detection circuit, causes the trigger application circuit to apply the trigger signal, and, after causing the trigger signal to be applied, and before the charging power is output from the first conversion circuit in a state where the power receiving antenna is opposed to the power transmitting antenna, causes the trigger application circuit to stop application of the trigger signal.

8. The wireless power transmission system of claim 6, wherein, the load includes a charge storing device; and, if a remaining energy amount in the charge storing device is greater than a predetermined value, the second control circuit stops operation of the trigger application circuit.

9. The wireless power transmission system of any of claim 1, wherein, the trigger application circuit includes an impedance element and a switch which are placed under a shunting condition at a point on a transmission line between the power receiving antenna and the load, and by controlling ON and OFF states of the switch, generates the trigger signal.

10. The wireless power transmission system of claim 1, wherein, the power transmitting antenna includes a pair of power transmitting electrodes having a shape that is elongated in one direction; and the power receiving antenna includes a pair of power receiving electrodes which become opposed to the pair of power transmitting electrodes when receiving the charging power.

11. The wireless power transmission system of claim 1, wherein the detecting power has a smaller voltage than a voltage of the charging power, and a frequency substantially equal to the frequency of the charging power.

12. The wireless power transmission system of claim 1, wherein the trigger signal contains at least one pulse having a duration longer than a period of the detecting power.

13. The wireless power transmission system of claim 1, wherein, after the current and/or voltage detected by the first detection circuit begins to fluctuate in response to application of the trigger signal, the first control circuit determines, before a time equivalent to one period of the fluctuation elapses, that the trigger signal has been applied, and causes the first conversion circuit to begin outputting the charging power.

14. The wireless power transmission system of claim 1, wherein, the trigger signal is a signal containing a frequency component of the charging power; and when a waveform of a fluctuation in the current and/or voltage detected by the first detection circuit contains a frequency component of the charging power, the first control circuit determines that the trigger signal has been applied, and causes the first conversion circuit to begin outputting the charging power.

15. The wireless power transmission system of claim 14, wherein the first detection circuit includes a filter circuit which selectively passes a signal of the frequency of the detecting power, the filter circuit being disposed at a point on the transmission line from the first power source to the power transmitting antenna.

16. The wireless power transmission system of claim 1, wherein the trigger signal contains a plurality of frequency components.

17. A power transmitting device for use in a wireless power transmission system, the wireless power transmission system including a power transmitting device and a power receiving device, the power transmitting device comprising:

a first conversion circuit to convert power supplied from a first power source into charging power to be directed to charging in the power receiving device;

a power transmitting antenna to send out the charging power which is output from the first conversion circuit;

a first control circuit to control the first conversion circuit; and a first detection circuit to detect a fluctuation in current and/or voltage at a point on a transmission line from the first power source to the power transmitting antenna, the power receiving device including:

a power receiving antenna to receive the charging power which is sent out from the power transmitting antenna;

a power receiving circuit to convert the charging power received by the power receiving antenna into an AC power of a frequency different from that of the charging power or DC power, and to supply the AC power or the DC power to a load;

a second conversion circuit to convert power supplied from a second power source into detecting power and supply the detecting power to the power receiving antenna;

a second control circuit to control the second conversion circuit, the second control circuit being configured to cause the second conversion circuit to output the detecting power in a state where the first conversion circuit is not outputting the charging power; and a trigger application circuit to apply a trigger signal for informing the power transmitting device of presence of the power receiving device onto the detecting power which is supplied from the second conversion circuit to the power receiving antenna, wherein, while the detecting power having the trigger signal applied thereto is supplied to the power receiving antenna, upon detecting the trigger signal based on a result of detection by the first detection circuit, the first control circuit causes the first conversion circuit to begin outputting the charging power.

18. A power receiving device for use in a wireless power transmission system, the wireless power transmission system including a power transmitting device and a power receiving device, the power transmitting device including:

a first conversion circuit to convert power supplied from a first power source into charging power to be directed to charging in the power receiving device;

a power transmitting antenna to send out the charging power which is output from the first conversion circuit;

a first control circuit to control the first conversion circuit; and a first detection circuit to detect a fluctuation in current and/or voltage at a point on a transmission line from the first power source to the power transmitting antenna, the power receiving device comprising:

a power receiving antenna to receive the charging power which is sent out from the power transmitting antenna;

a power receiving circuit to convert the charging power received by the power receiving antenna into an AC power of a frequency different from that of the charging power or DC power, and to supply the AC power or the DC power to a load;

a second conversion circuit to convert power supplied from a second power source into detecting power and supply the detecting power to the power receiving antenna;

a second control circuit to control the second conversion circuit, the second control circuit being configured to cause the second conversion circuit to output the detecting power in a state where the first conversion circuit is not outputting the charging power; and a trigger application circuit to apply a trigger signal for informing the power transmitting device of presence of the power receiving device onto the detecting power which is supplied from the second conversion circuit to the power receiving antenna, wherein, while the detecting power having the trigger signal applied thereto is supplied to the power receiving antenna, upon detecting the trigger signal based on a result of detection by the first detection circuit, the first control circuit causes the first conversion circuit to begin outputting the charging power.

\* \* \* \* \*